US011312026B2

(12) United States Patent
Velasquez et al.

(10) Patent No.: US 11,312,026 B2
(45) Date of Patent: Apr. 26, 2022

(54) PLACEMENT AND COMPACTION OF OBJECTS VIA VACUUM

(71) Applicant: The Boeing Company, Chicago, IL (US)

(72) Inventors: Luis Felipe Velasquez, Charleston, SC (US); Allen James Halbritter, Charleston, SC (US); Daniel Johnson, Charleston, SC (US)

(73) Assignee: The Boeing Company, Chicago, IL (US)

( * ) Notice: Subject to any disclaimer, the term of this patent is extended or adjusted under 35 U.S.C. 154(b) by 291 days.

(21) Appl. No.: 16/598,175

(22) Filed: Oct. 10, 2019

(65) Prior Publication Data
US 2021/0107169 A1 Apr. 15, 2021

(51) Int. Cl.
*B25J 15/06* (2006.01)
*B64F 5/10* (2017.01)

(52) U.S. Cl.
CPC ............. *B25J 15/0616* (2013.01); *B64F 5/10* (2017.01)

(58) Field of Classification Search
CPC .... B25J 15/0616; B25B 11/005; B23Q 3/088; B64F 5/10
See application file for complete search history.

(56) References Cited

U.S. PATENT DOCUMENTS

| 5,427,518 A | 6/1995 | Morizot et al. |
| 2013/0036922 A1* | 2/2013 | Stewart ................. B30B 11/001 100/35 |

| 2013/0153140 A1 | 6/2013 | Fernández et al. |
| 2014/0265058 A1 | 9/2014 | Gautier et al. |
| 2014/0367037 A1 | 12/2014 | Metschan et al. |
| 2017/0050393 A1 | 2/2017 | Duclos et al. |
| 2017/0129195 A1 | 5/2017 | Stephenson et al. |

(Continued)

FOREIGN PATENT DOCUMENTS

| CN | 102741040 A | 10/2012 |
| CN | 106239935 A | 12/2016 |
| CN | 106671444 A | 5/2017 |

OTHER PUBLICATIONS

European Search Report; Application EP20192633; dated Mar. 10, 2021.

(Continued)

*Primary Examiner* — Tyrone V Hall, Jr.
*Assistant Examiner* — Abbie E Quann
(74) *Attorney, Agent, or Firm* — Duft & Bornsen, PC

(57) ABSTRACT

Systems and methods are provided for vacuum handling of composite parts. One embodiment is a method for picking up, placing, and compacting an object. The method includes covering a part of an object with an impermeable membrane, applying a negative pressure via an end effector that is sufficient to offset any air leaks between a first portion of the impermeable membrane and the object, thereby forming a suction hold that secures the object to the impermeable membrane, and transporting the object to a rigid tool while the suction hold is retained. The method further comprises applying a negative pressure via the end effector that offsets air leaks between a second portion of the impermeable membrane and the rigid tool, thereby forming a suction hold that compacts the object to the rigid tool.

20 Claims, 22 Drawing Sheets

(56) References Cited

U.S. PATENT DOCUMENTS

2018/0339413 A1 11/2018 Halbritter
2019/0047158 A1 2/2019 Petrovski

OTHER PUBLICATIONS

U.S. Appl. No. 14/936,870.
Chinese Office action; Application 201810479529.4; dated Feb. 8, 2022.

* cited by examiner

STAGE 1 - BOTTOM

STAGE 1 - SIDE

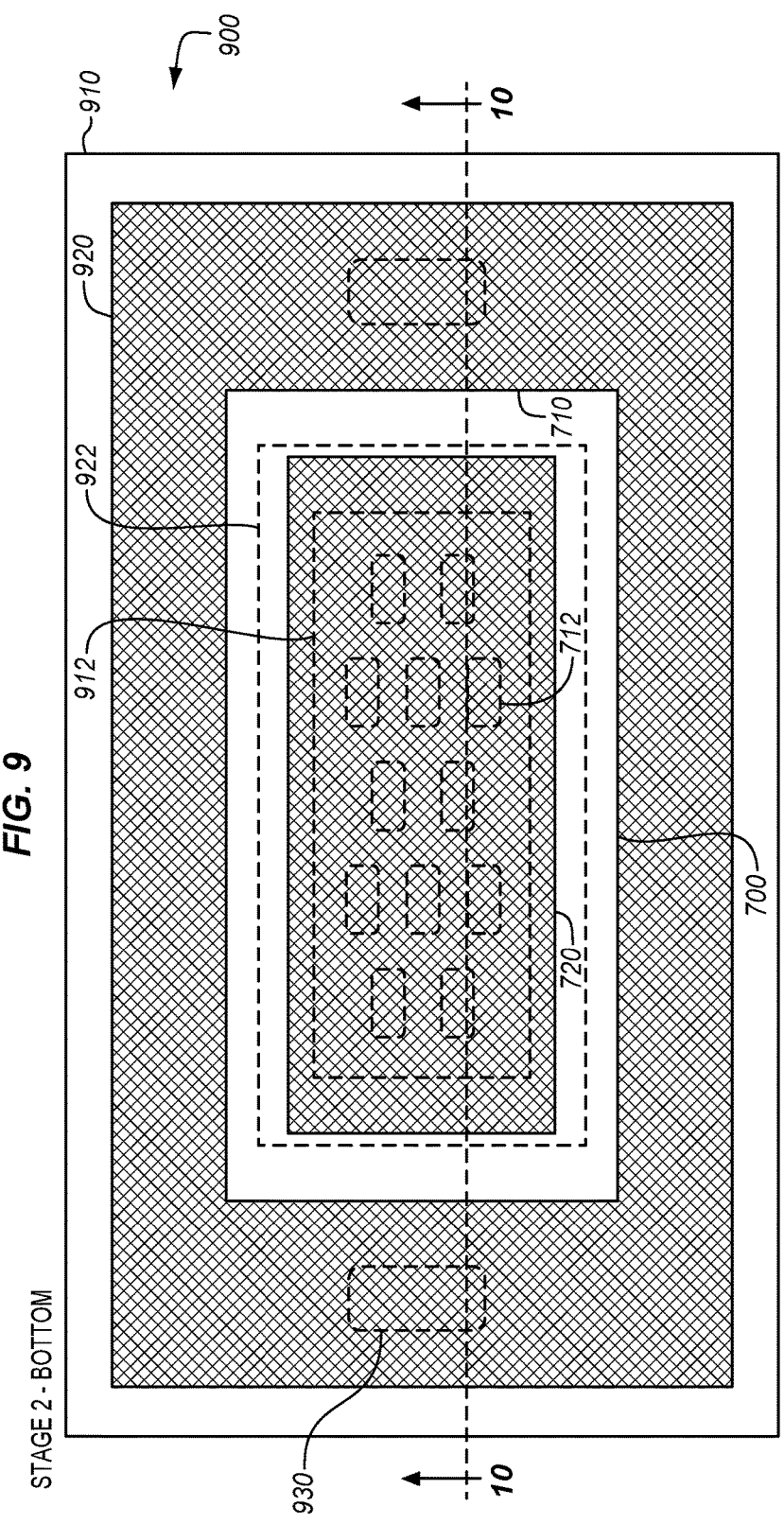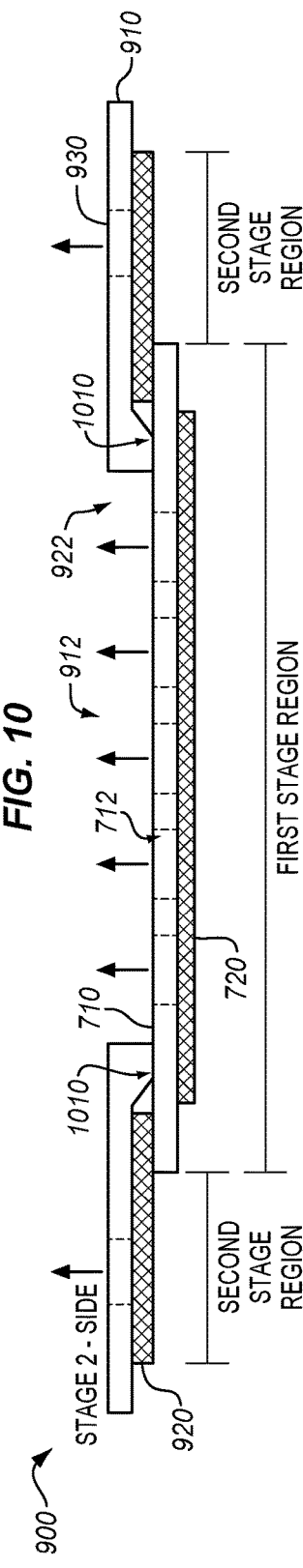

RECEIVER - SIDE

PLACEMENT AND COMPACTION OF OBJECTS VIA VACUUM

FIELD

The disclosure relates to the field of assembly, and in particular, to placement and compaction of objects such as preforms onto rigid tools.

BACKGROUND

A preform for a composite part may be incapable of supporting itself when placed onto a sloped surface of a rigid tool. In particular, placement of large preforms onto rigid tooling that exhibits a complex curvature (e.g., barrel shapes) remains complicated. This is because large preforms have an increased chance of peeling or shifting from the rigid tooling during or after placement. Furthermore, materials such as tacky tape used to secure a vacuum bag to the surface of a rigid tool are not contact approved, and hence are not allowed to touch uncured composite material. As a result, the entire layup must be completed prior to compaction of the layup to the rigid tooling via a vacuum bag. These difficulties are further compounded when preforms are placed around an entire circumference of a rigid tool prior to being hardened. If the preforms are not quickly and firmly compacted onto the rigid tool, then peeling may occur, which may in turn necessitate rework.

Thus, it remains desirable to quickly and effectively move and secure preforms (and/or other objects) to complex surfaces.

SUMMARY

Embodiments described herein provide high volume vacuum systems that quickly and effectively pick and place objects such as preforms onto complex surfaces, and that compact the objects into place via vacuum. Specifically, the embodiments described herein utilize two-phase vacuum systems which operate a first portion to generate a suction hold for carrying an object to a rigid tool, and operate a second portion to generate a suction hold that compacts the object onto the rigid tool. Compaction ensures that the object remains secured to the rigid tool, regardless of the orientation of the rigid tool.

One embodiment is a method for picking up, placing, and compacting an object. The method includes covering a part of an object with an impermeable membrane, applying a negative pressure via an end effector that is sufficient to offset any air leaks between a first portion of the impermeable membrane and the object, thereby forming a suction hold that secures the object to the impermeable membrane, and transporting the object to a rigid tool while the suction hold is retained. The method further comprises applying a negative pressure via the end effector that offsets air leaks between a second portion of the impermeable membrane and the rigid tool, thereby forming a suction hold that compacts the object to the rigid tool.

A further embodiment is a non-transitory computer readable medium embodying programmed instructions which, when executed by a processor, are operable for performing a method for picking up, placing, and compacting an object. The method includes covering a part of an object with an impermeable membrane, applying a negative pressure via an end effector that offsets air leaks between a first portion of the impermeable membrane and the object, thereby forming a suction hold that secures the object to the impermeable membrane, and transporting the object to a rigid tool while the suction hold is retained. The method further comprises applying a negative pressure via the end effector that is sufficient to offset any between a second portion of the impermeable membrane and the rigid tool, thereby forming a suction hold that compacts the object to the rigid tool.

A still-further embodiment is an apparatus. The apparatus includes an end effector that is configured to pick up and places an object onto a rigid tool. The end effector includes an impermeable membrane that is divided into a first portion that is configured to form a suction hold with the object, and a second portion that is configured to form a suction hold which compresses the object onto the rigid tool. The apparatus further includes a vacuum port, and a pump coupled with the vacuum port that is configured to provide sufficient volumetric flow to offset any air leaks at edges of the impermeable membrane when the impermeable membrane is placed against the object.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIGS. 9-10 are views of a second stage that is integrated with a first stage of a securement pad in an illustrative embodiment.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Composite parts, such as Carbon Fiber Reinforced Polymer (CFRP) parts, are initially laid-up in multiple layers that together are referred to as a preform. Individual fibers within each layer of the preform are aligned parallel with each other, but different layers exhibit different fiber orientations in order to increase the strength of the resulting composite part along different dimensions. The preform includes a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber is infused with resin prior to hardening. For thermoset resins, the hardening is a one-way process referred to as curing, while for thermoplastic resins, the resin reaches a viscous form if it is re-heated, after which it can be consolidated to a desired shape and solidified. As used herein, the umbrella term for the process of transitioning a preform to a final hardened shape (i.e., transitioning a preform into a composite part) is referred to as "hardening," and this term encompasses both the curing of thermoset preforms and the forming/solidifying of thermoplastic preforms into a final desired shape. With this understanding in mind, further discussion focuses upon vacuum securement systems for compacting objects, such as preforms for composite parts, onto rigid tooling.

Figure 1:
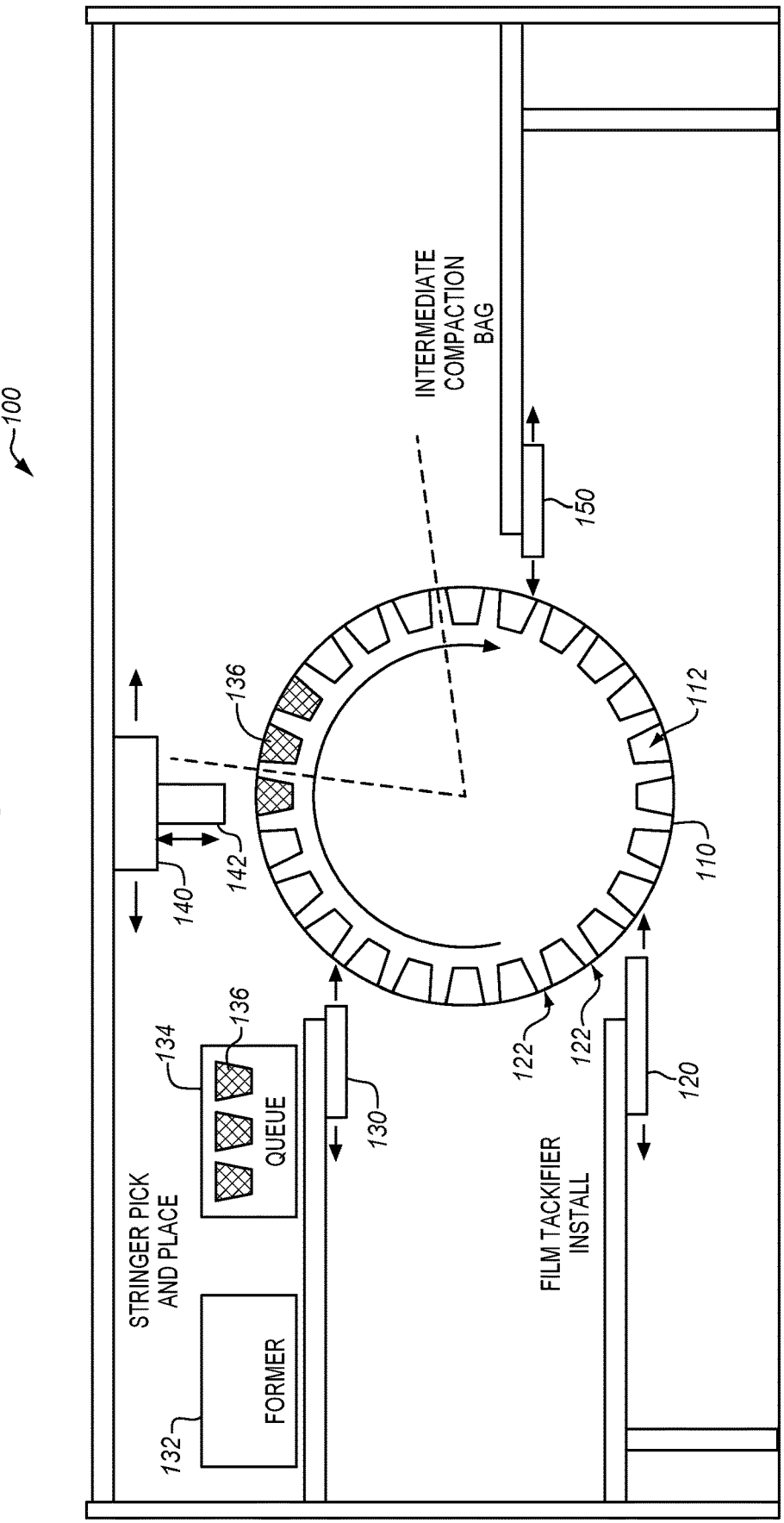
FIG. 1 is a diagram illustrating an assembly environment that includes a vacuum securement system in an illustrative embodiment.

FIG. 1 is a diagram of an assembly environment 100 that includes a vacuum securement system 140 in an exemplary embodiment. Vacuum securement system 140 comprises any system, device, or component operable to selectively apply negative pressure (e.g., suction) to different regions of an impermeable membrane in order to pick up and place, then secure an object to a rigid tool. In this embodiment, vacuum securement system 140 is utilized to pick up and place the preforms 136 for stringers, and to secure the preforms 136 into troughs 112 at a mandrel 110 for a full-barrel section of a fuselage of an aircraft. After the preforms 136 have been placed, an Inner Mold Line (IML) ply (not shown) is placed over the preforms 136 to form a full-barrel section preform. The mandrel 110 is then vacuum bagged and hardened in an autoclave in order to form a section of fuselage for integration into an airframe of an aircraft.

In this embodiment, assembly environment 100 includes a tackifier installation station 120, which comprises an end effector, sprayer, or other device for applying a thin layer of tackifier 122 at stringer flange locations that border each trough 112. That is, the tackifier 122 is placed proximate to the troughs 112 (e.g., at edges bordering the troughs 112), but not within the troughs 112. The tackifier 122 secures the preforms 136 in place, but only forms a firm bond with the preforms 136 via the application of pressure/compaction. Thus, mere placement of a preform 136 atop the tackifier 122 may be insufficient to fully retain a preform 136 in a desired position.

In further embodiments, tackifier 122 is omitted, such as if contact between a preform 136 and the mandrel 110 is sufficient to retain the preform in place. That is, in some embodiments it is beneficial to compact a preform 136 onto a rigid tool that does not have tackifier, particularly when the preform 136 has an inherent amount of tack that is activated via compaction.

Assembly environment 100 further includes a prep station 130 that includes a former 132 (e.g., a layup mandrel) upon which preforms 136 are laid-up and/or consolidated into desired shapes, as well as a queue 134 that holds one or more preforms 136 that have been fully shaped via former 132.

As the mandrel 110 rotates, troughs 112 that have been treated with tackifier 122 move into position for receiving preforms. Vacuum securement system 140 utilizes an end effector 142 to pick up and place the preforms 136 from queue 134 into troughs 112. Vacuum securement system 140 further operates the end effector 142 to apply preliminary compaction to preforms 136 at troughs 112. This activates the tackifier 122 next to each trough 112, which ensures that preforms 136 remain in place within the troughs 112 (e.g., to the fraction of an inch along their entire length) until an intermediate compaction bag station 150 (e.g., comprising an end effector, vacuum pump, and/or other machine) fully compacts the preforms 136 into place.

Illustrative details of the operation of vacuum securement system 140 will be discussed with regard to FIG. 2. Assume, for this embodiment, that an object (e.g., a preform) has been laid-up and placed onto queue 134. Detailed depictions of the operations of method 200 are described below with regard to FIGS. 3-18.

Figure 2:
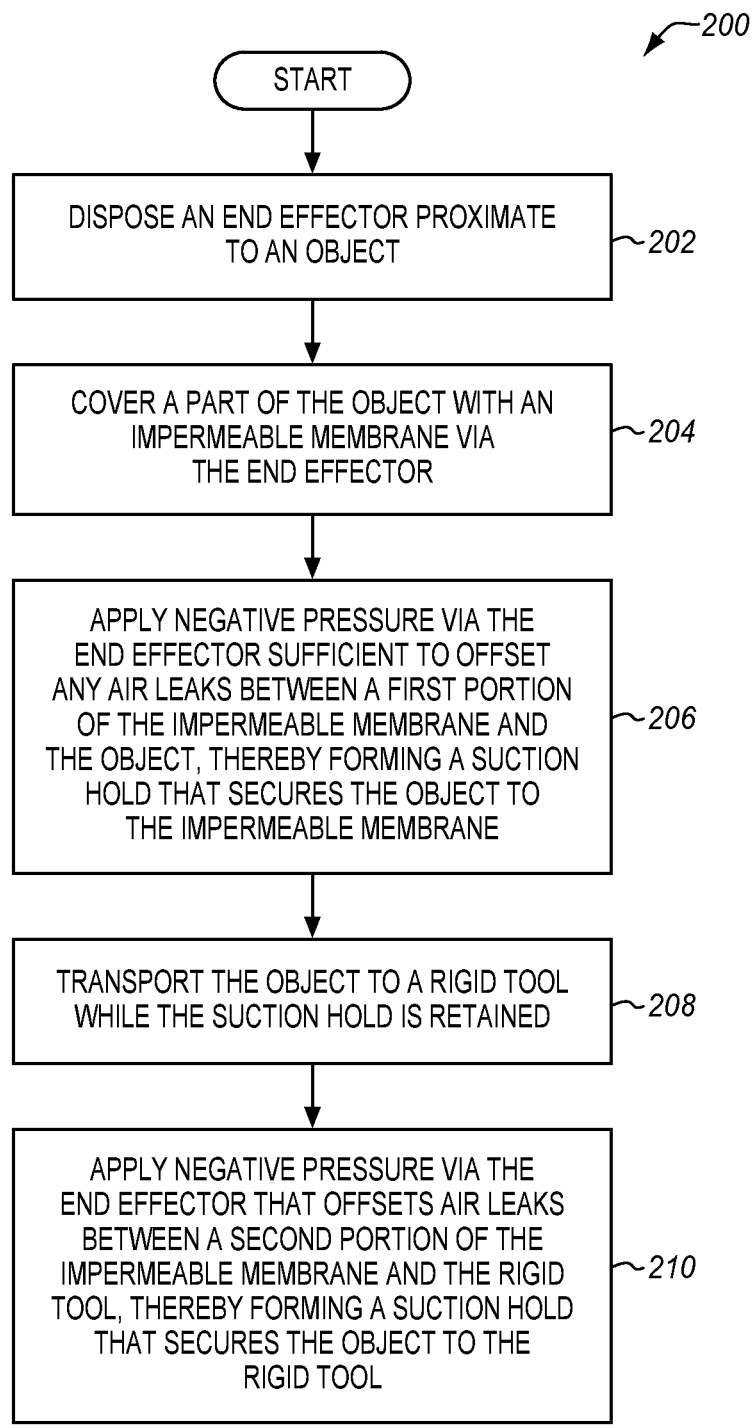
FIG. 2 is a flowchart illustrating a method for performing vacuum securement of a part in an illustrative embodiment.

FIG. 2 is a flowchart illustrating a method 200 for performing vacuum securement of a part in an illustrative embodiment. The steps of method 200 are described with reference to vacuum securement system 140 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, an end effector 142 is disposed proximate to (e.g., over) the object (e.g., preform 136). In one embodiment, this comprises operating the end effector 142 in accordance with a Numerical Control (NC) program at vacuum securement system 140, in order to guide the end effector 142 into position over the object. At this point, an impermeable membrane may surround a border of the end effector.

In step 204, the object is covered with an impermeable membrane via the end effector 142. In one embodiment, a first portion of the impermeable membrane is surrounded by the object, while a second portion of the impermeable membrane surrounds the object. That is, the first portion is within the bounds of the object, and is therefore capable of applying suction directly to the object. The second portion extends beyond the bounds of the object, and therefore is capable of applying suction to an area that surrounds the object. This has the effect of drawing the impermeable membrane against the area that surrounds the object, which compacts the object.

The impermeable membrane is impermeable to gas, and may comprise a plastic or rubberized sheet. The impermeable membrane is not glued or attached to the object, but rather rests atop the object. When a vacuum is applied to the impermeable membrane (e.g., via one or more holes within an interior of the impermeable membrane), the borders of the impermeable membrane will form a suction hold against the object, when more air is being drawn out than is capable of entering via any leaks between the object and the impermeable membrane at the border of the impermeable membrane.

In step 206, the end effector applies negative pressure sufficient to offset/overcome any air leaks between a first portion of the impermeable membrane and the object. That is, when negative pressure is applied, the borders of the first portion of the impermeable membrane are drawn into suction contact with the object, because as air is removed the borders of the impermeable membrane are brought into contact with the object. This operation forms a suction hold that secures the object to the impermeable membrane, regardless of air leaks that might occur between the impermeable membrane and the object.

In step 208, the end effector 142 transports the object to a rigid tool (e.g., mandrel 110) while the suction hold is retained. In one embodiment, this step comprises operating one or more actuators and/or rail systems to drive the end effector 142 into position over the rigid tool while negative pressure continues to be applied. The end effector 142 may further place the object into position within a trough 112. In further embodiments, multiple end effectors are operated synchronously to transport the object.

In step 210, the end effector 142 applies negative pressure sufficient to offset any air leaks between a second portion of the impermeable membrane and the rigid tool, thereby forming a suction hold that secures the object to the rigid tool. In one embodiment, the second portion surrounds the first portion, and covers (or is in fluid communication with a preliminary compaction bag that covers) the boundaries of the object. When negative pressure is applied, the second portion applies suction that pulls the second portion towards the rigid tool. This suction hold compacts the object into place at the rigid tool, which activates the tackifier 122 via pressure. In one embodiment, applying negative pressure to the second portion draws air from a preliminary compaction bag which covers the object and extends beyond a perimeter of the object.

After compaction has been completed, the end effector 142 stops applying negative pressure, and the suction hold applied to the object and/or rigid tool is released. The current object is then covered with an intermediate compaction bag that applies a greater amount of compaction force, and the end effector 142 then travels to retrieve and place another object.

Method 200 provides a technical benefit over prior techniques, because it enables preliminary compaction of an object to be performed immediately during and/or after placement of an object onto a mandrel, and without the need for taping a vacuum bag in place or performing other time-consuming operations. This prevents the object from "hanging free" and reduces the chances of the object peeling after placement, which reduces labor and delays associated with rework.

Figure 3:
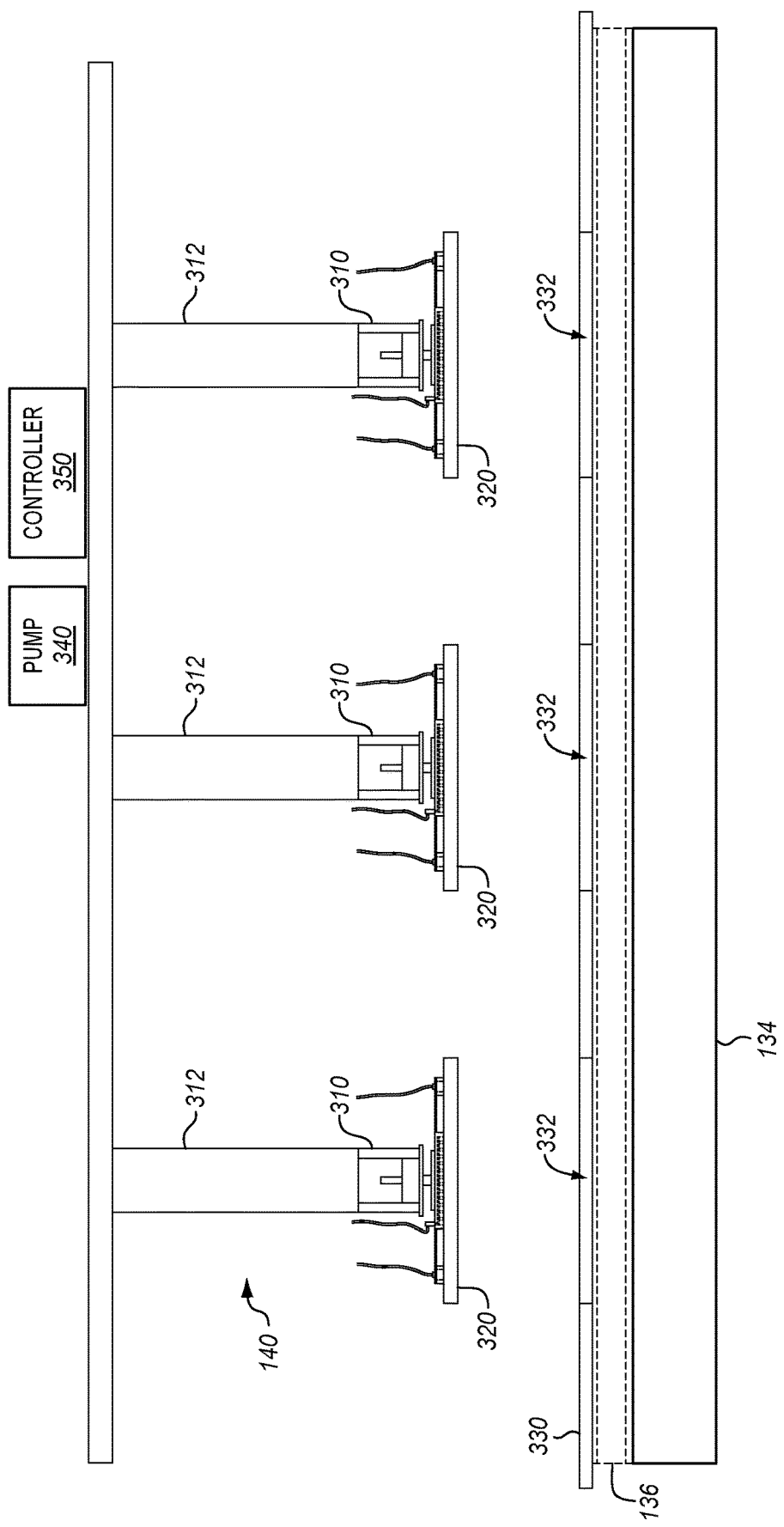
FIGS. 3-5 are diagrams illustrating operation of a vacuum securement system to pick up a preform for a stringer in an illustrative embodiment.
Figure 4:
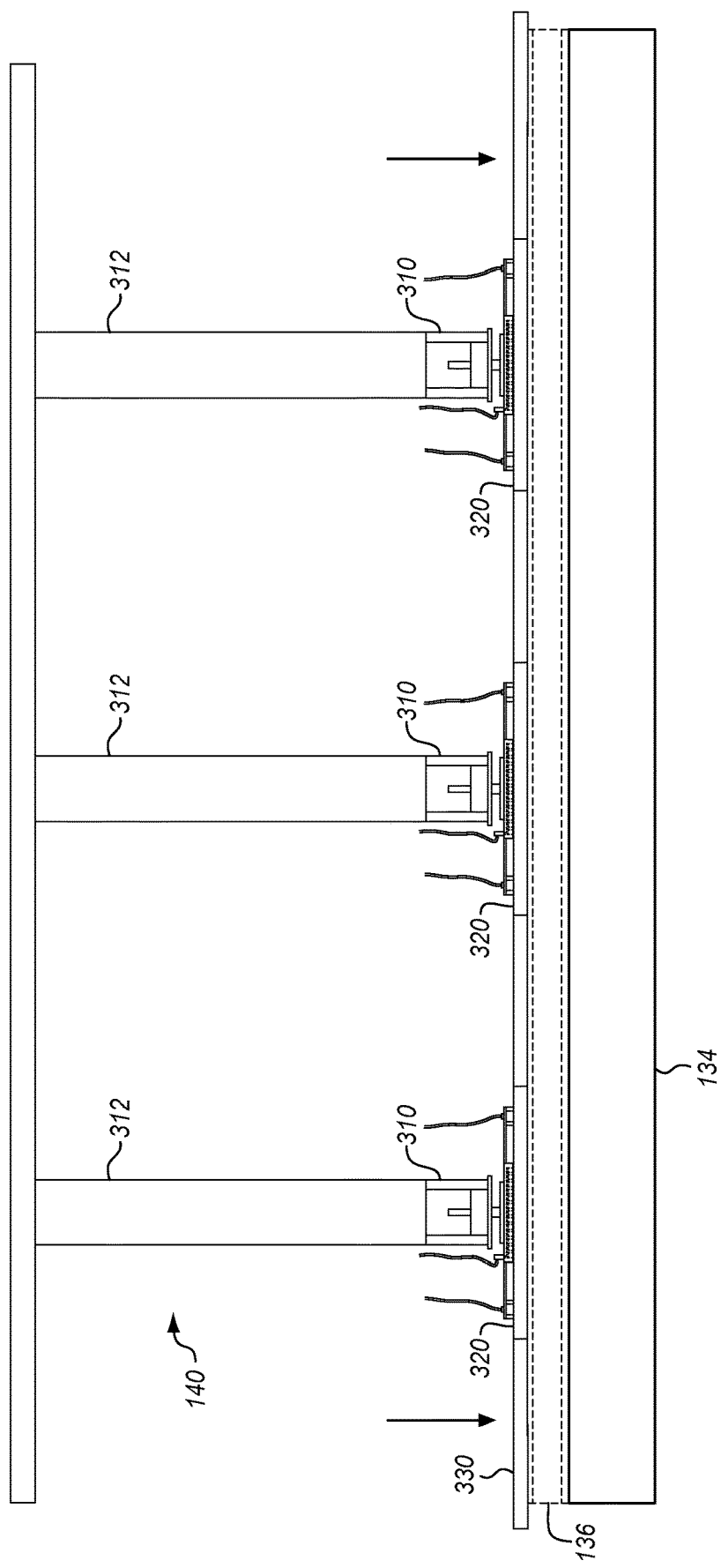
Figure 5:
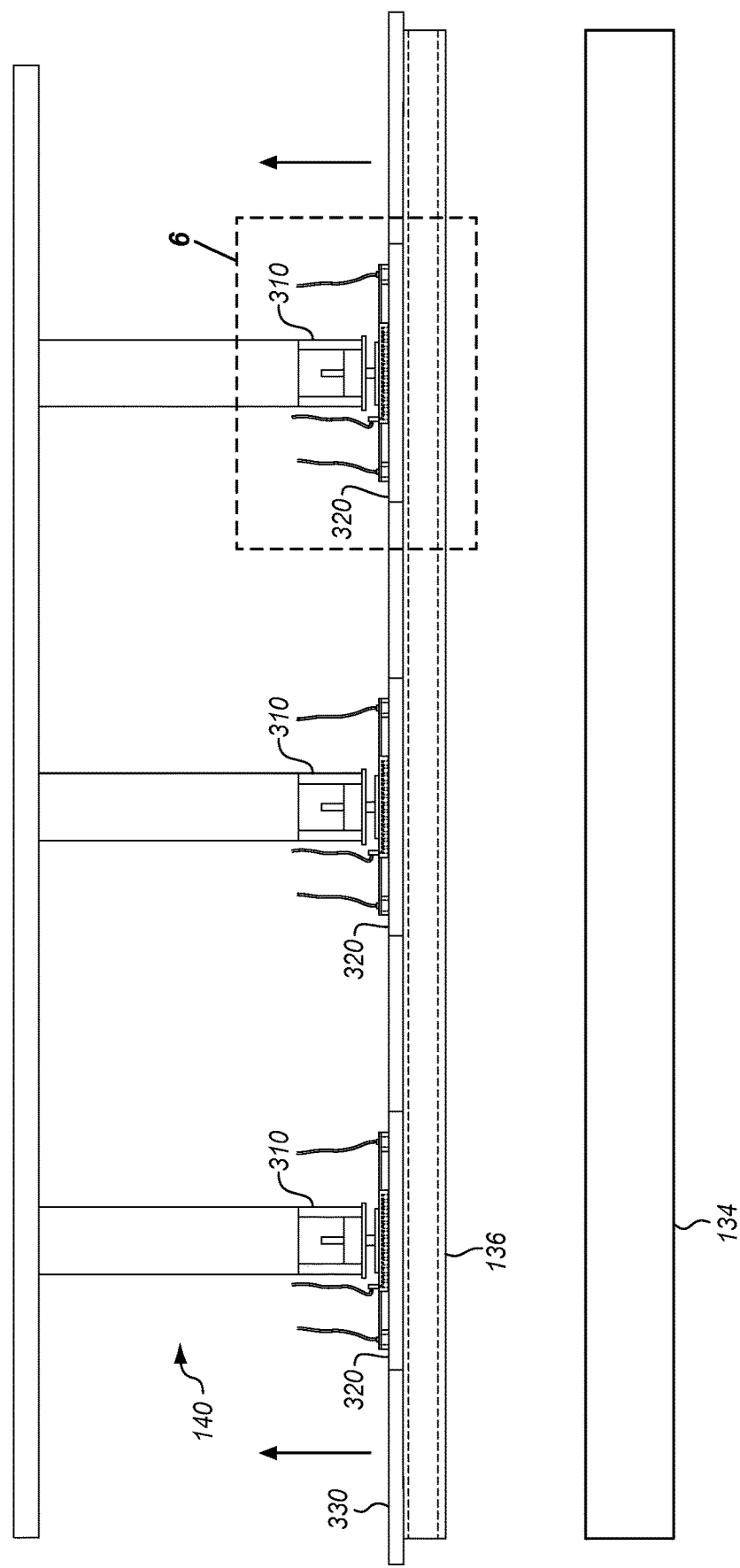

FIGS. 3-5 are diagrams illustrating operation of a vacuum securement system to pick up a preform for a stringer in an illustrative embodiment. In this embodiment, vacuum securement system 140 comprises multiple end effectors 310. Each end effector 310 is mounted to an actuator 312 and includes a securement pad 320 (e.g., a combination of permeable and impermeable components). Each securement pad includes a first stage for picking up an object, and a second stage for compacting the object to a rigid tool. During operation, each securement pad 320 is placed into a gap 332 within a preliminary compaction bag 330 that covers a preform 136.

When applying suction to grip the object, pump 340 applies suction by removing a higher volume of air than is lost via gaps between a first stage of the securement pad 320 and the preform 136. This means that the first stage of the securement pad 320 does not need to be sealed via tape, sealant, or other materials to the object being transported. Instead, this component is capable of relying on suction applied by pump 340 in order to perform picking and placing of an object.

When applying suction to compact the object to a rigid tool, the pump 340 provides sufficient volumetric flow to offset air leaks between a second stage of the securement pad and the preliminary compaction bag 330, as well as air leaks between the preliminary compaction bag 330 and the rigid tool. This means that the second stage of the securement pad 320 does not need to be sealed via tape, sealant, or other materials to the rigid tool, nor does the preliminary compaction bag 330 have to be secured via such means. Instead, these components are capable of relying on suction applied by pump 340 in order to perform compaction.

Controller 350 manages the operations of the pump 340, the actuators 312, and the end effectors 310 in accordance with an NC program stored in memory. Controller 350 may be implemented, for example, as custom circuitry, as a hardware processor executing programmed instructions, or some combination thereof.

In one embodiment, pump 340 applies twenty-two to twenty-nine inches of mercury of negative pressure to form a vacuum, but at tens of Cubic Feet per minute (CFM) of airflow (e.g., between fifty and two hundred CFM). Hence, pump 340 may be capable of maintaining a pressure of at least one inch of mercury across an area covered by the preliminary compaction bag 330. Controller 350 manages the operations of pump 340 based on input from a sensor (not shown) such as a pressure sensor or flow rate sensor, in order to ensure that vacuum is constantly within a desired range to overcome leaks along the perimeter of the preliminary compaction bag 330. For example, controller 350 may increase or decrease a speed or intensity of pumping operations in order to maintain a constant volume flow of air, or in order to maintain a constant negative pressure.

The amount of holding force used to lift or compact an object is based upon the difference between a volume per unit time drawn by pump 340, and a volume per unit time at which air leaks through ends of the securement pads 320 and/or preliminary compaction bag 330, and a total area covered by the securement pads 320 and/or preliminary compaction bag 330. The preliminary compaction bag 330 and the securement pads 320 are not affixed the object via sealant, glue, fasteners, magnetism, etc. However, vacuum is maintained by pump 340 while air is leaking into the system through the perimeter. Thus, minor air leaks may still exist in this configuration, because negative pressure is the primary (e.g., sole) force that is used to generate a suction for hold moving or compacting the object. However, negative pressure is maintained by evacuating an equal or greater amount of air than is lost via these leaks.

In FIG. 4, actuators 312 are activated to drive the end effectors 310 downward into gaps 332, such that the securement pads 320 are placed into contact with the preform 136.

In FIG. 5, a suction hold is applied to the preform 136 via a first stage of the securement pads, and the preform 136 is lifted upward and off of queue 134. The preliminary compaction bag 330 is also lifted by this operation.

Figure 6:
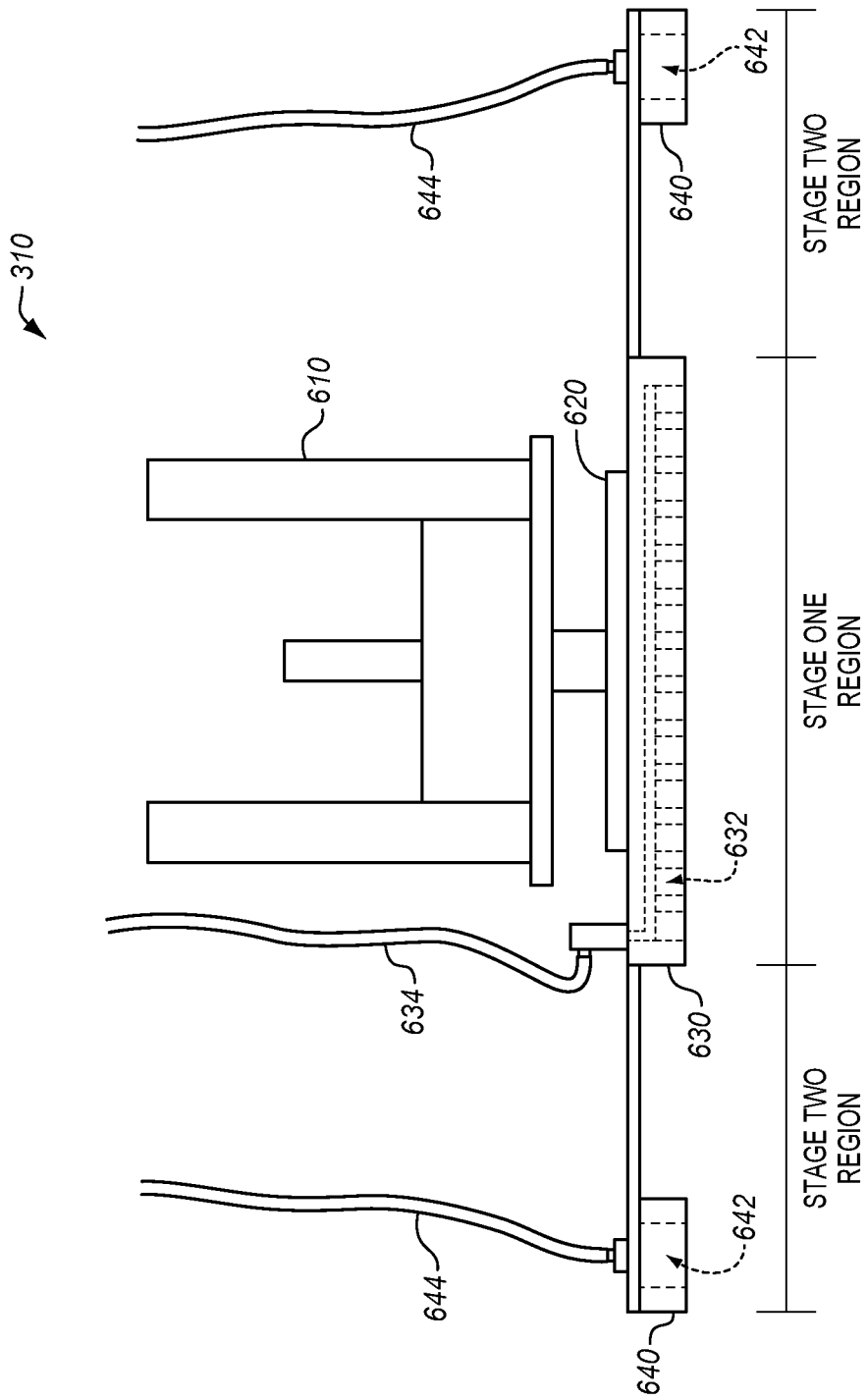
FIG. 6 is a zoomed in view of an end effector for a vacuum securement system in an illustrative embodiment.

FIG. 6 is a zoomed in view of an end effector 310 for a vacuum securement system in an illustrative embodiment. FIG. 6 illustrates a body/frame 610 that provides structural strength to the end effector 310, as well as a base 620 to which a manifold 630 is attached. When suction is applied from a vacuum port 634 via passages 632 in the manifold 630, a suction hold is applied via a first stage of a securement pad (not shown in this figure) to an underlying object in a first region. End effector 310 further comprises one or more outriggers 640, which include passages 642 for receiving suction from vacuum ports 644. In one embodiment, outriggers 640 are utilized to compact an object after an object has been placed by the end effector. This is accomplished by applying suction via a second region/stage of a securement pad (not shown in this figure) to an underlying rigid tool in a second region. The vacuum ports of FIG. 6 are coupled with pump 340 via any suitable technologies and/or controllable air logic.

Figure 7:
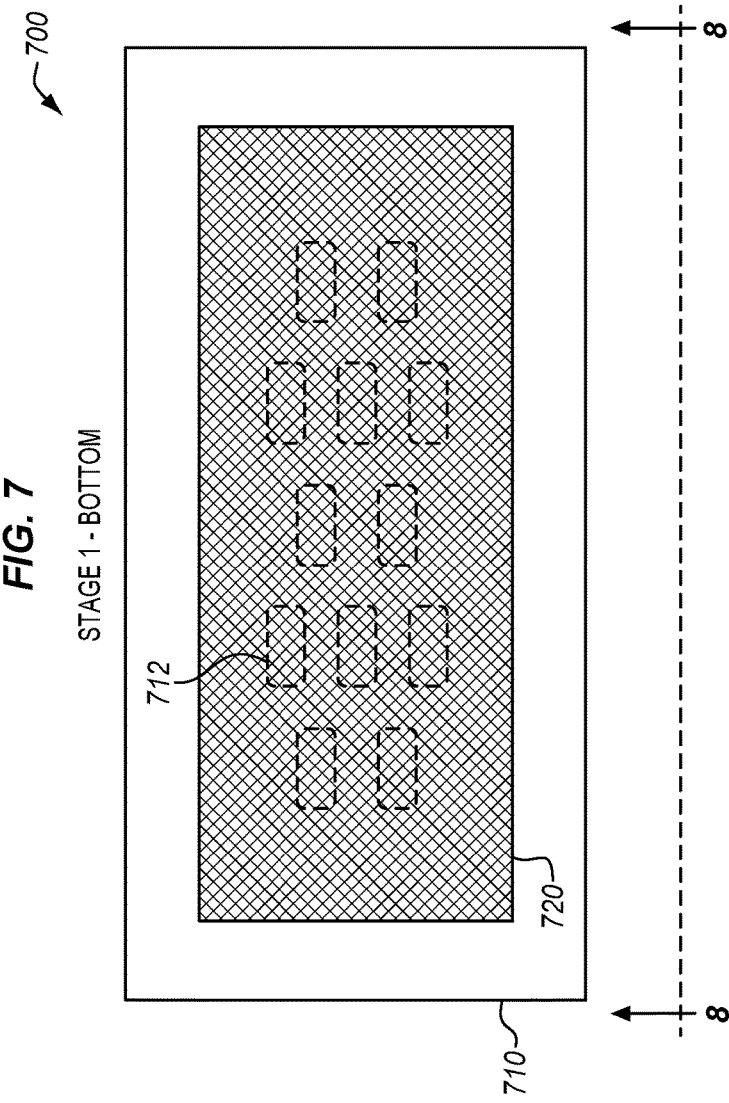
FIGS. 7-8 are views of a first stage of a securement pad in an illustrative embodiment.
Figure 8:
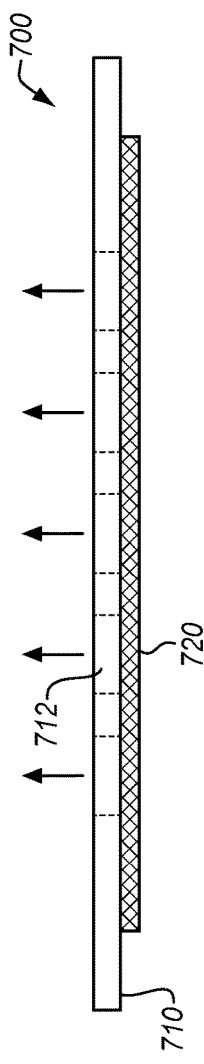

FIGS. 7-8 are views of a first stage 700 of a securement pad 320 in an illustrative embodiment. Specifically, FIG. 7 is a bottom view and FIG. 8 is a side view that corresponds with view arrows 8 of FIG. 7. The first stage 700 is utilized to apply a suction hold to an object during and/or after picking and placement of the object. In this embodiment, the first stage 700 includes a permeable layer 720, and an impermeable layer 710 that extends beyond the boundaries of the permeable layer 720. The impermeable layer 710 includes cut-outs 712, which enable suction to be applied through the impermeable layer 710. During initial placement, permeable layer 720 is placed onto an object, is conformed to the object, and is held between the object and the impermeable layer 710. When suction is applied via cut-outs 712, the permeable layer 720 distributes suction across the impermeable layer 710.

Permeable layer 720 is both laterally and vertically air-permeable. Permeable layer 720 therefore ensures that a sufficient volume of air moves across an object to apply negative pressure evenly across the object, instead of being localized at a vacuum port. Where the permeable layer 720 terminates, the impermeable layer 710 grips the underlying object. Thus, when suction is applied to a first region, a grip in the shape of the outline of a rectangle (i.e., having the size of the permeable layer 720) is applied to an underlying object.

Permeable layer 720 comprises a material that is capable of deforming as suction draws impermeable layer 710 toward an object. Thus, permeable layer 720 draws snugly over an object while still enabling air to be drawn freely across the object. In this manner, permeable layer 720 enables the drawing of air across an object without causing markoff or leaving some type of undesirable mark upon the object. For example, permeable layer 720 may comprise a compliant biplanar mesh of material that facilitates airflow. Permeable layer 720 is a high-flow material, which is to say that permeable layer 720 does not substantially restrict the rate at which a pump draws air. The resistance of permeable layer 720 to airflow therefore has a negligible impact on the flow rate of a pump that applies a negative pressure. In some embodiments, permeable layer 720 comprises an open celled foam material. However, in such embodiments, the open celled foam material chosen is sufficiently rigid that it does not collapse when a suction hold is applied, and sufficiently open that airflow is not inhibited. Collapsing of the permeable layer 720 would shut off or restrict air flow, which is undesirable as air flow would then be restricted. Permeable layer 720 may comprise a contact approved material that is acceptable for use with carbon fiber composites and does not chemically interact with resin.

FIGS. 9-10 are views of a second stage 900 that is integrated into a first stage 700 of a securement pad in an illustrative embodiment. Specifically, FIG. 9 is a bottom view and FIG. 10 is a section cut side view that corresponds with view arrows 10 of FIG. 9. Second stage 900 includes a permeable layer 920 which partially overlaps impermeable layer 710 and includes a rectangular cut-out 922. During initial placement, the permeable layer 920 is conformed with the object, and contacts/overlaps a permeable layer at a preliminary compaction bag. Second stage 900 further includes an impermeable layer 910, which partially overlaps impermeable layer 710 and includes a rectangular cut-out 912. Impermeable layer 910 further includes cut-outs 930, which are disposed for alignment with outriggers 640 of FIG. 6.

Impermeable layer 910 is glued, epoxied, melted, or otherwise affixed to impermeable layer 710 at seams 1010, which are gas-impermeable. Thus, when suction is applied via cut-outs 712, permeable layer 720 applies suction only to an object in the first region. When suction is applied via cut-outs 930, permeable layer 920 applies suction only to a second region that surrounds the object, and thus compresses/compacts the object into place.

Figure 11:
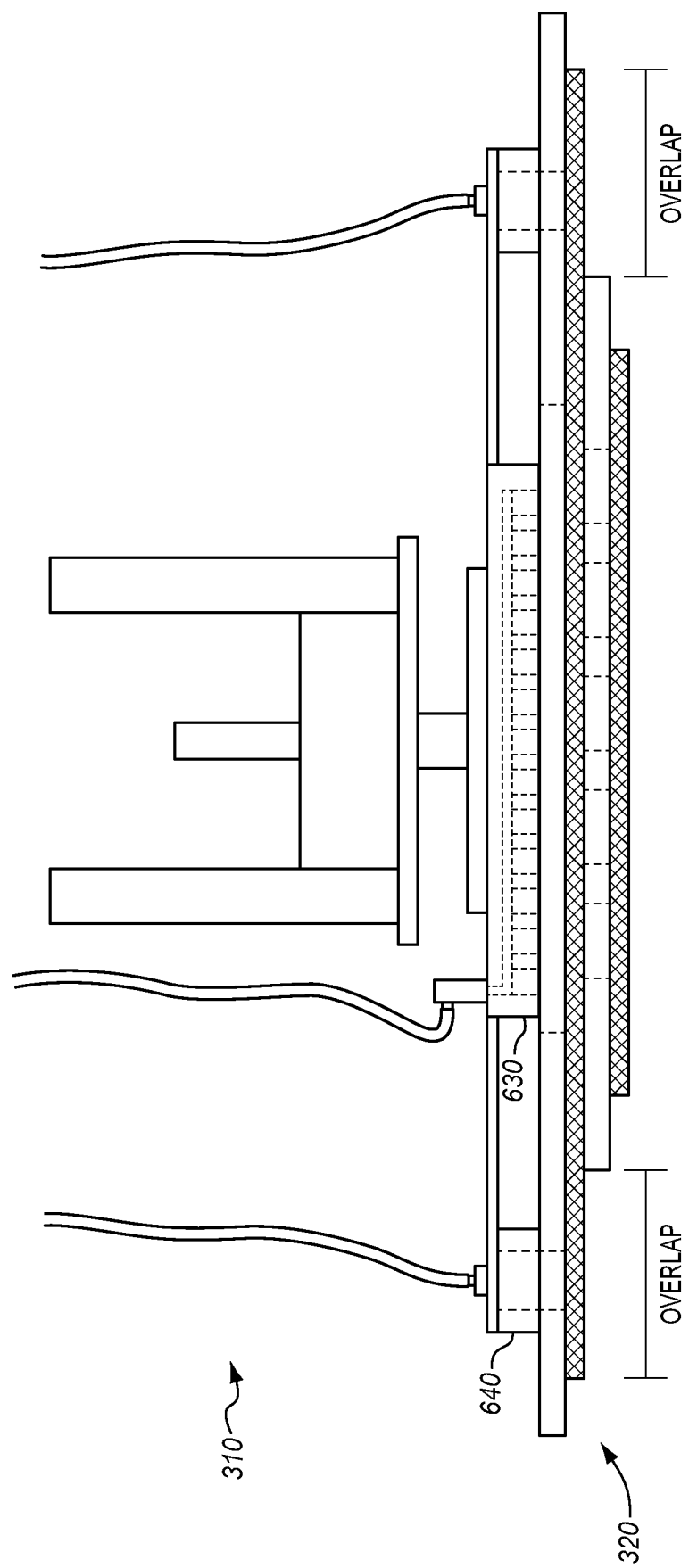
FIG. 11 is a zoomed in view of an end effector that includes a securement pad for a vacuum securement system in an illustrative embodiment.
Figure 12:
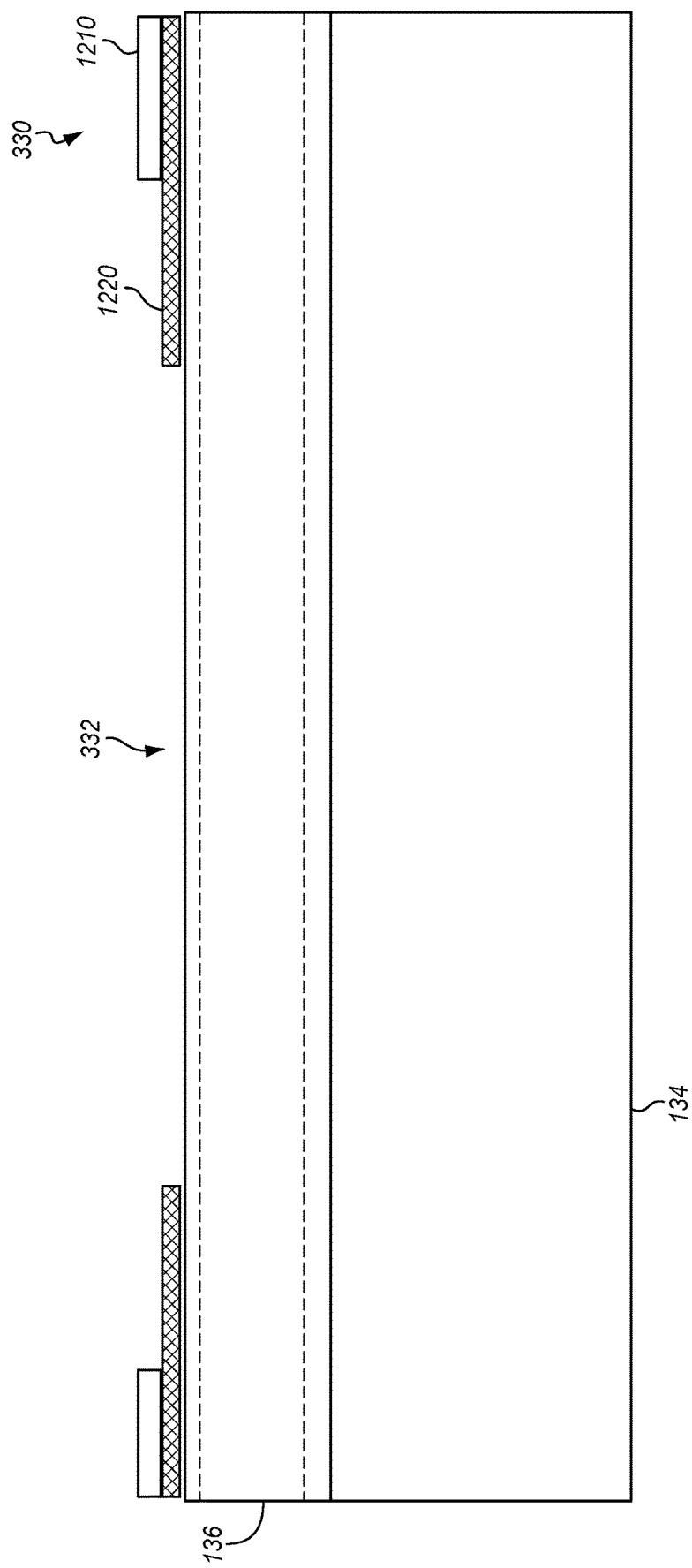
FIGS. 12-18 illustrate a preform for a stringer that is picked up from a queue and transferred to a rigid tool for hardening into a composite part in an illustrative embodiment.

FIG. 11 is a zoomed in view of an end effector 310 that includes a securement pad 320 for a vacuum securement system in an illustrative embodiment. FIG. 11 depicts interconnections between the manifold 630, outriggers 640, and the stages of the securement pad. FIG. 11 further illustrates regions of overlap, wherein a permeable layer of the securement pad 320 will overlap a permeable layer disposed at a preliminary compaction bag. This enables suction applied to the overlap region to be distributed across the entire preliminary compaction bag.

FIGS. 12-18 illustrate a preform for a stringer that is picked up from a queue and transferred to a rigid tool for hardening into a composite part in an illustrative embodiment. Specifically, in FIG. 12, a side view is illustrated wherein the preform 136 sits atop a queue 134, and is covered by a preliminary compaction bag 330 that includes a gap 332 for receiving a securement pad 320. This forms a receiver for receiving an end effector. The gap extends into and out of the page by less than the dimensions of the preliminary compaction bag 330. Thus, the gap 332 forms a hole within the preliminary compaction bag 330.

The preliminary compaction bag 330 surrounds the preform 136, and therefore extends beyond the boundaries of the preform 136 to the left and right of the page, as well as extending beyond the boundaries of the preform 136 into and out of the page.

The preliminary compaction bag 330 includes an impermeable layer 1210, and a permeable layer 1220 that continues into the gap 332 and is dimensioned for overlapping with a permeable layer of a securement pad. The permeable layer 1220 and the impermeable layer 1210 surround the gap 332 into and out of the page. Furthermore, the permeable layer 1220 surrounds the preform 136, but is itself surrounded by the impermeable layer 1210.

Figure 13:
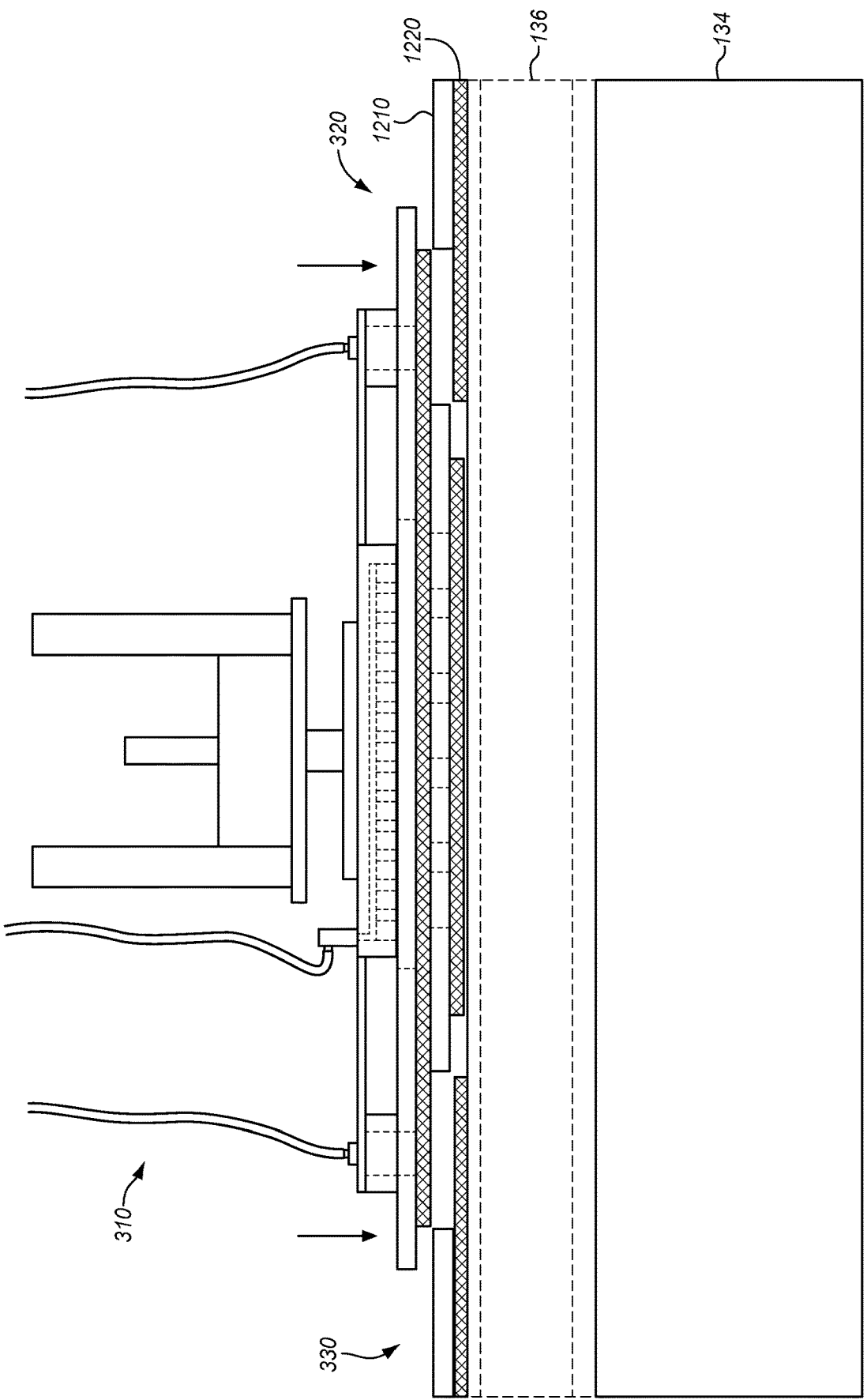
Figure 14:
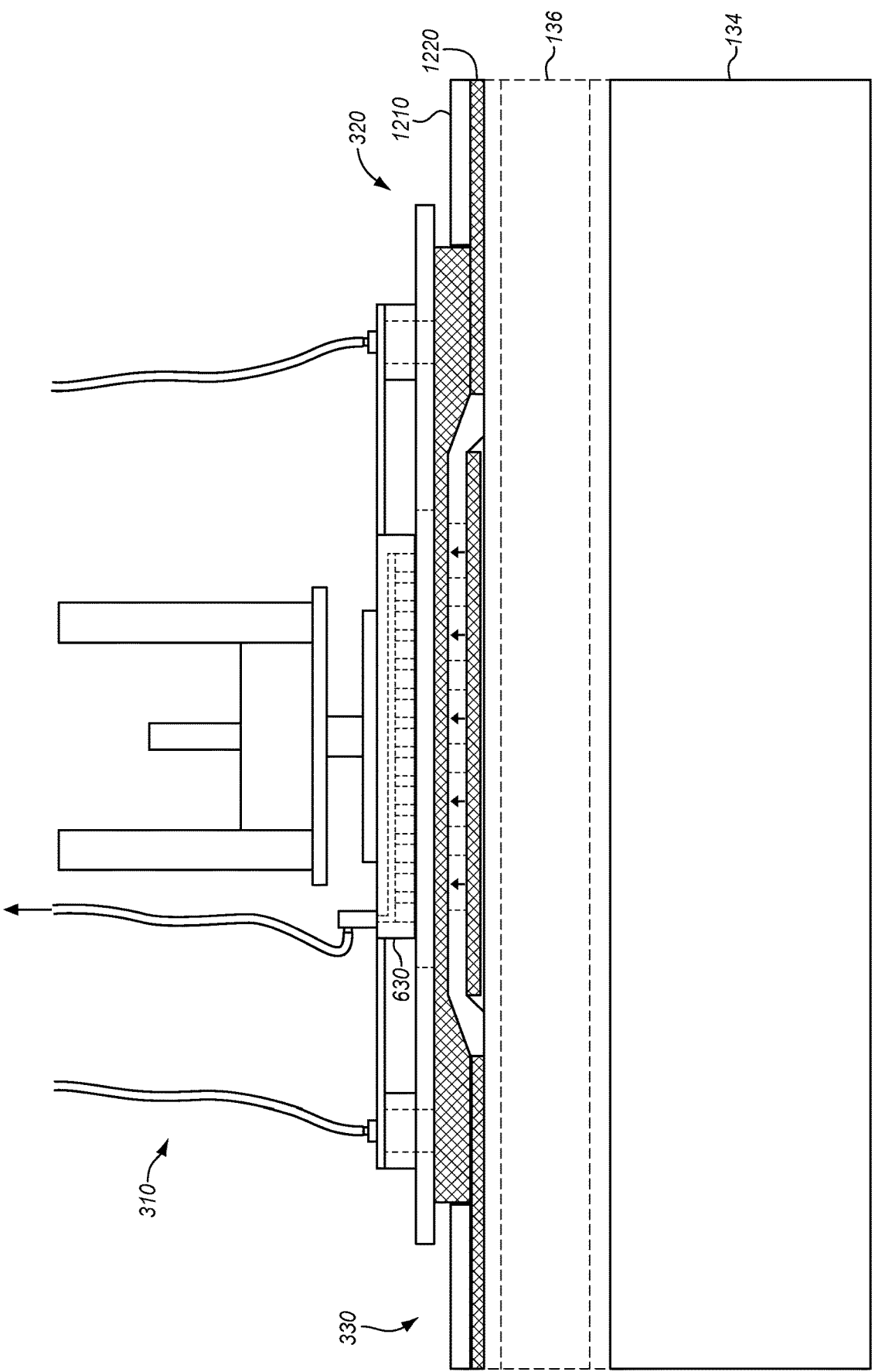

In FIG. 13, an end effector is placed over the gap 332. In order to form a suction hold, in FIG. 14 negative pressure is applied to the first stage of the securement pad 320 via manifold 630. The negative pressure sucks more air than is lost via a boundary between the securement pad 320 and the preform 136. Thus, the preform 136 is held in contact with the securement pad 320 via suction.

Figure 15:
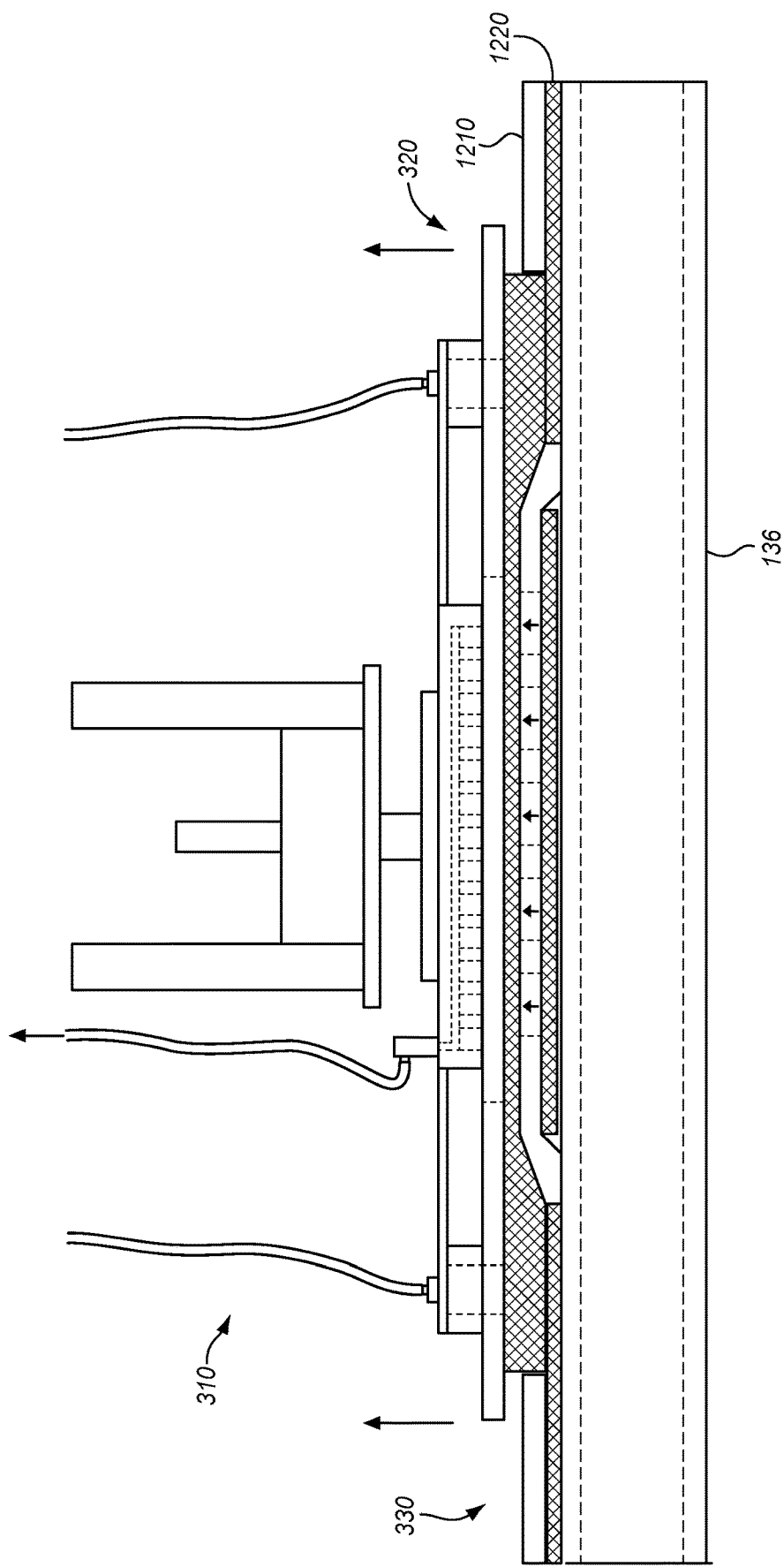
Figure 16:
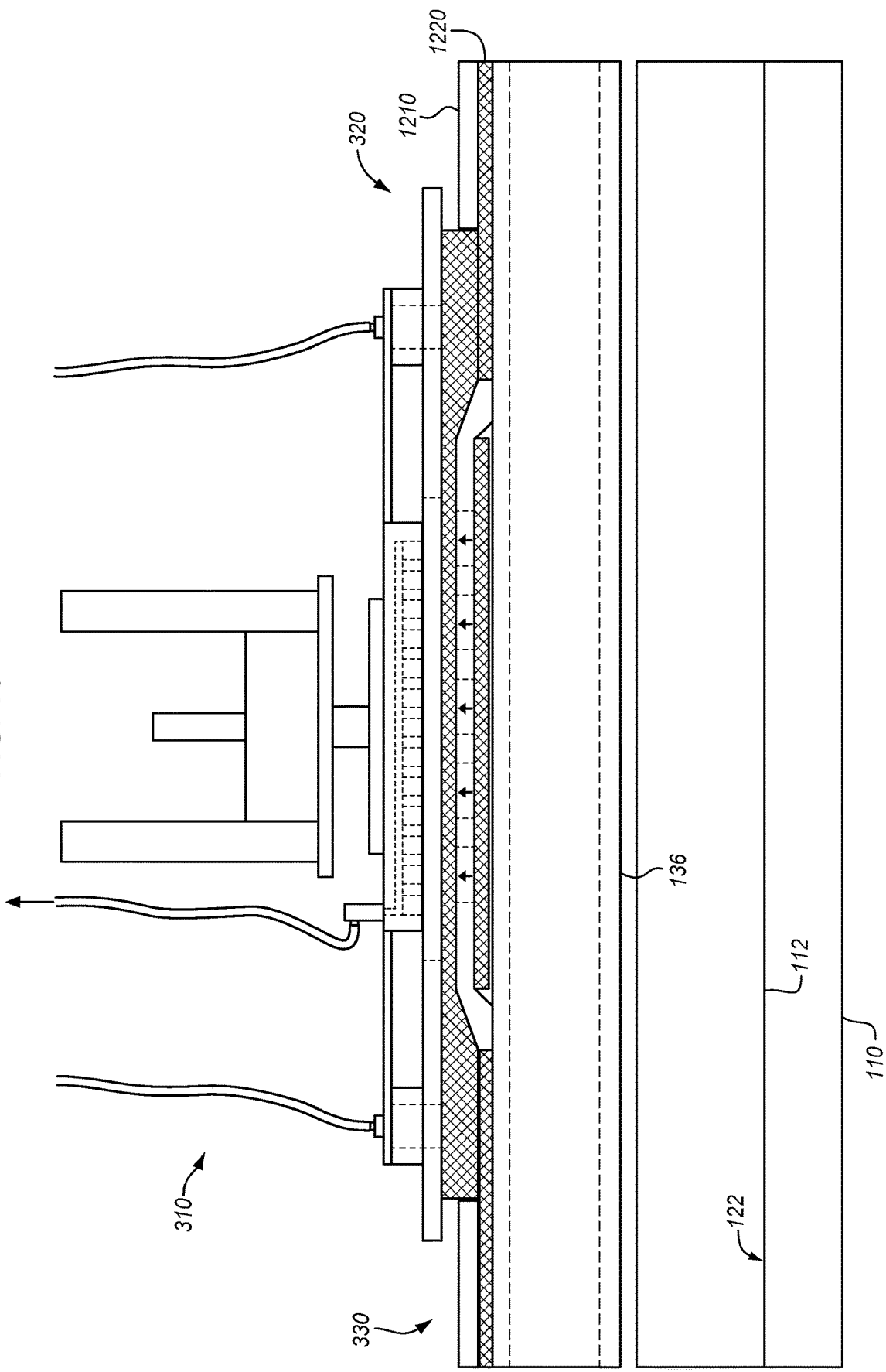
Figure 17:
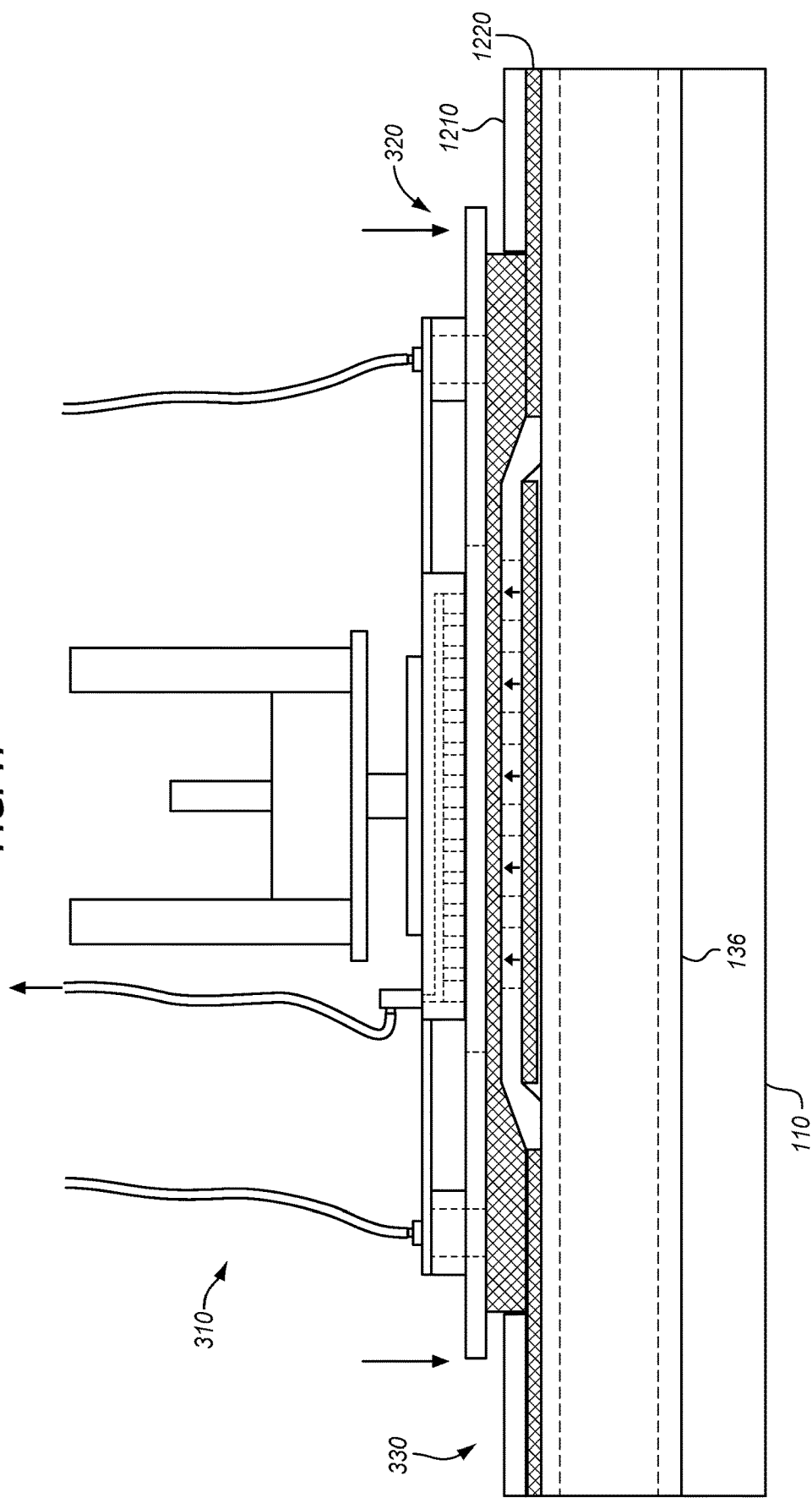
Figure 18:
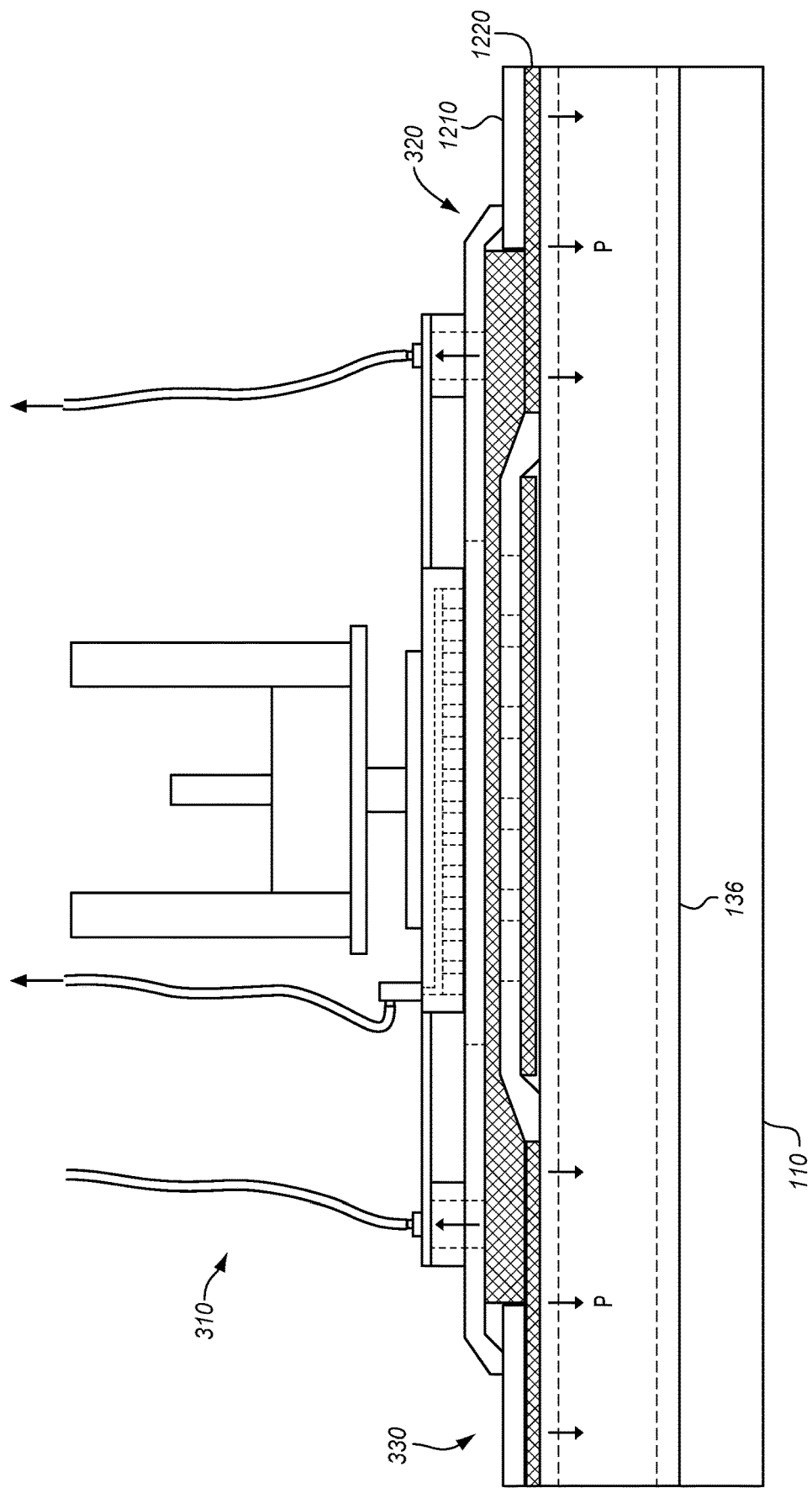

In FIG. 15, the preform 136 is lifted off of the queue 134 and moved towards a trough while the suction hold is maintained. In FIG. 16, the preform 136 is positioned over a trough 112, and in FIG. 17, the preform 136 is lowered into place at the trough 112. In FIG. 18, negative pressure is applied via the second stage of the securement pad 320. The negative pressure (P) continues through permeable layer 1220 of the preliminary compaction bag, and therefore is uniformly applied across the entirety of the preform 136. During compaction, the impermeable layer 1210 is drawn downward against the preform 136. This operation may be performed while the first stage continues to apply negative pressure, or after negative pressure is no longer being applied to the first stage. The compaction process pushes the preform into contact with a tackifier 122, which secures the preform 136 firmly into place.

Figure 19:
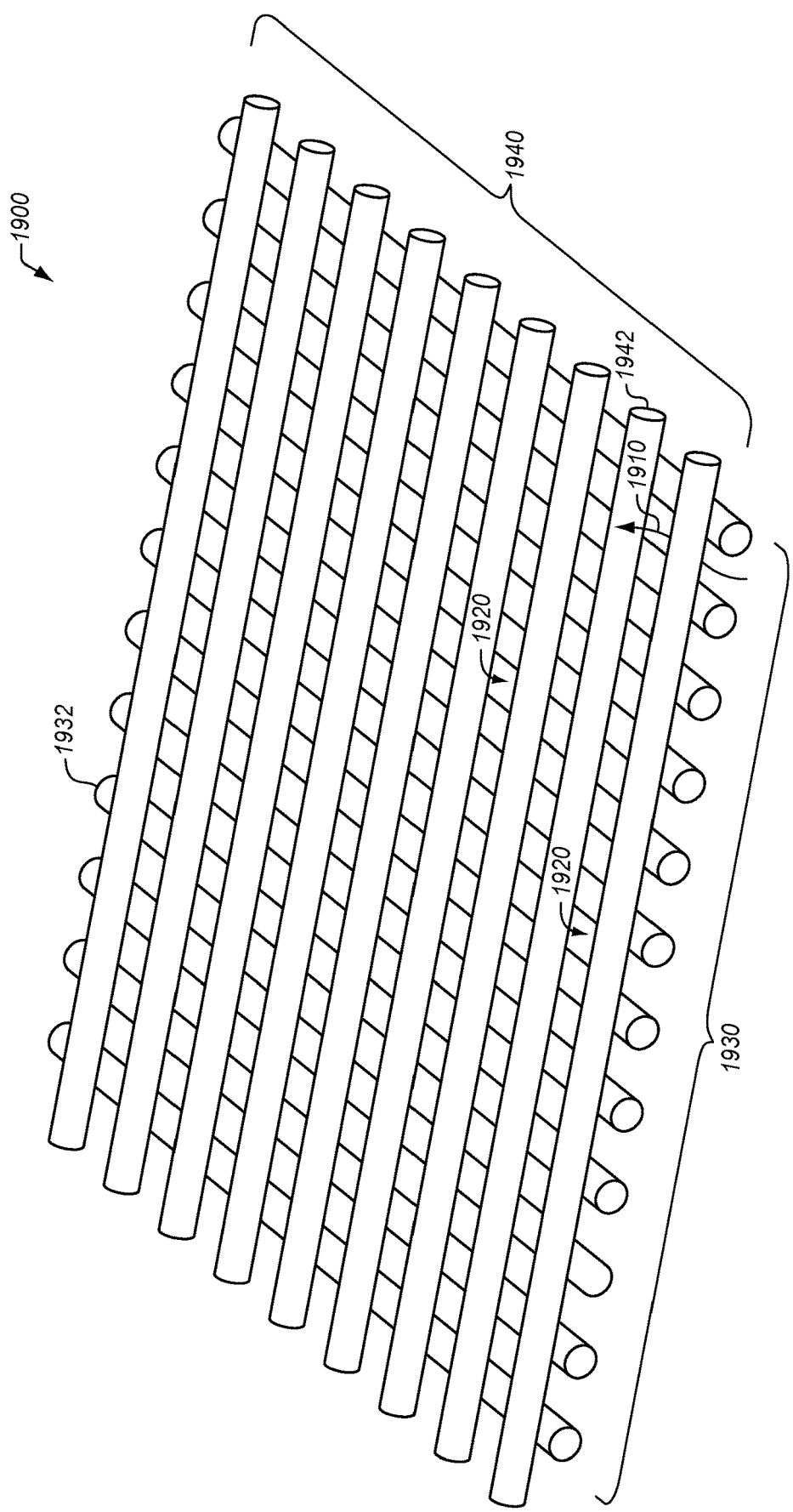
FIG. 19 is a perspective view of a permeable layer that facilitates application of vacuum for a vacuum securement system in an exemplary embodiment.

FIG. 19 is a perspective view of a permeable layer 1900 that facilitates application of vacuum for a vacuum securement system in an exemplary embodiment. FIG. 19 is a perspective view of a permeable layer 1900 that is both vertically and laterally air-permeable. That is, air 1910 may flow freely through gaps 1920 in permeable layer 1900, as well as across gaps 1920 in permeable layer 1900. This is possible because permeable layer 1900 is a biplanar mesh. A first layer 1930 of the biplanar mesh comprises structural elements 1932 that are arranged parallel with each other, and a second layer 1940 of the biplanar mesh comprises structural elements 1942 that are arranged parallel with each other, but in a different direction than the first layer 1930. The first layer 1930 enables air to flow horizontally in a first direction, and the second layer 1940 enables air to flow horizontally in a second direction. Meanwhile, both layers allow air to flow freely vertically. Thus, if a negative pressure is applied to one portion of permeable layer 1900, the negative pressure may draw air evenly across the entirety of permeable layer 1900. Permeable layer 1900 enables free airflow, and does not interfere with the drawing of air by a pump. That is, permeable layer 1900 does not limit the flow rate of a pump. Permeable layer 1900 may comprise polyethylene, polypropylene, nylon, etc. In one embodiment, permeable layer 1900 is chosen as a "contact approved" material that will not chemically interfere with the adhesion of curable resin at the object being secured. For example, permeable layer 1900 may be made from a silicone free material that does not mark the object beneath it.

Figure 20:
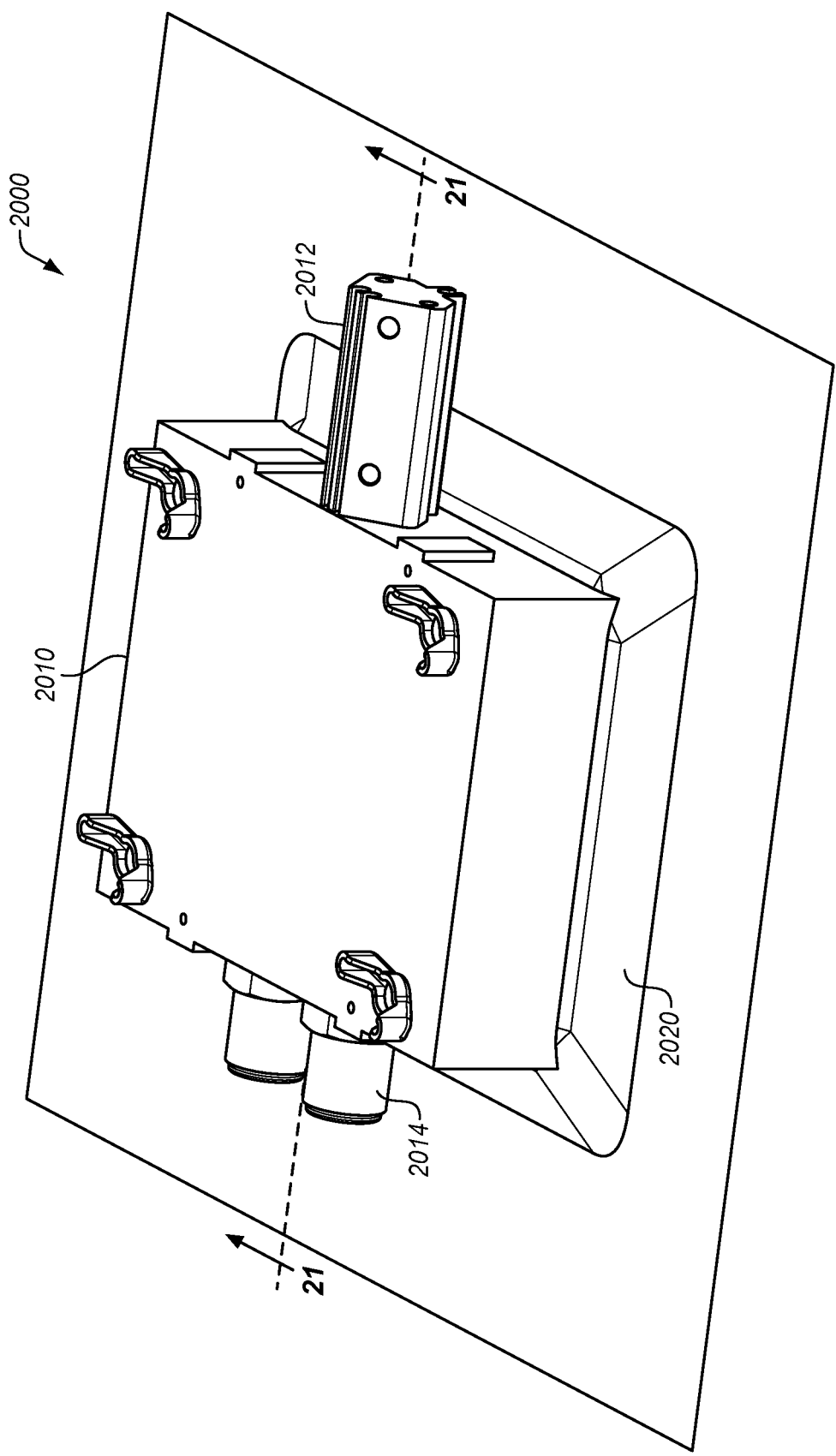
FIGS. 20-22 illustrate a base of an end effector that applies suction via multiple stages in an illustrative embodiment.
Figure 21:
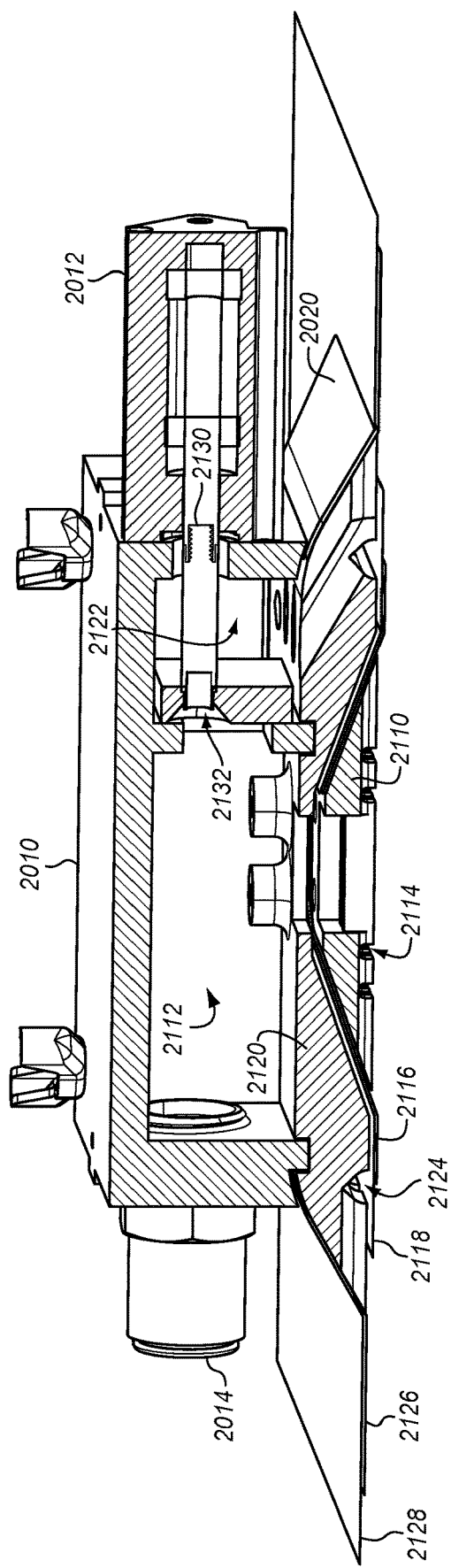
Figure 22:
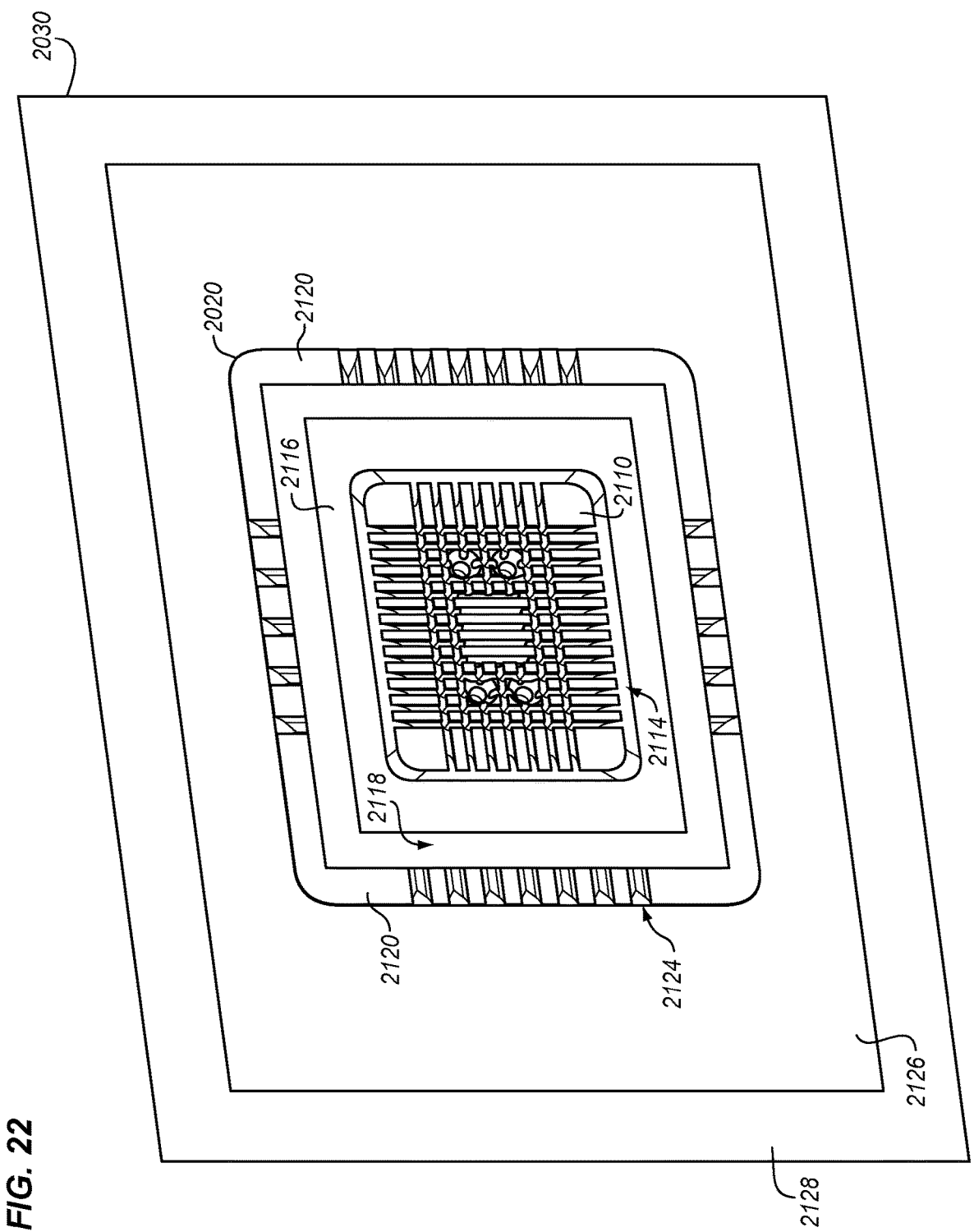

FIGS. 20-22 illustrate a base 2000 of an end effector that applies suction via multiple stages in an illustrative embodiment. In this embodiment, the base 2000 includes integral components for selectively applying negative pressure to a first stage and a second stage of a securement pad.

FIG. 20 illustrates that the base 2000 includes a body 2010, vacuum ports 2014, and an actuator housing 2012. The base 2000 is coupled to a manifold 2020 for distributing negative pressure across an area. FIG. 21 is a cut-through view of base 2000 that corresponds with view arrows 21 of FIG. 20. In FIG. 21, the interior of the base 2000 is visible. The interior includes a first chamber 2112 for applying negative pressure to a first stage, and a second chamber 2122 for applying negative pressure to a second stage. An actuator 2130 moves within the actuator housing 2012 to selectively expose an opening 2132 between the first chamber 2112 (that applies negative pressure via a first stage manifold 2110 to a first portion) and the second chamber 2122 (that applies negative pressure via a second stage manifold 2120 to a second portion). In this manner, negative pressure from vacuum ports 2014 is controllably applied to the first chamber, or to both the first chamber and the second chamber.

Negative pressure applied from the first chamber 2112 is received at first stage permeable membrane 2116 via first stage manifold 2110 and first stage passages 2114. Negative pressure applied from the second chamber 2122 is received at second stage permeable membrane 2126 via second stage manifold 2120 and second stage passages 2124. Second stage manifold 2120 is pressure sealed from first stage manifold 2110 via first stage impermeable membrane 2118. Meanwhile, a second stage impermeable membrane 2128 forms a pressure seal for second stage manifold 2120, which prevents air leaks from being formed external to the second stage manifold 2120.

FIG. 22 is a bottom perspective view of the base 2000, and depicts the first stage manifold 2110, first stage passages 2114, first stage permeable membrane 2116, and first stage impermeable membrane 2118. FIG. 22 further depicts the second stage manifold 2120, second stage passages 2124, second stage permeable membrane 2126, and second stage impermeable membrane 2128 which terminates at border 2030

The configuration of base 2000 provides a technical benefit over prior systems, because it enables for rapid transitions between applying suction to a first stage (e.g., in order to grip a preform) and applying suction to a second stage (e.g., in order to compact the preform after placement). This reduces and/or eliminates the amount of time spent by the preform in an uncompacted state after it has been placed, which in turn reduces the chances of peeling and associated rework.

EXAMPLES

In the following examples, additional processes, systems, and methods are described in the context of a vacuum securement system.

Figure 23:
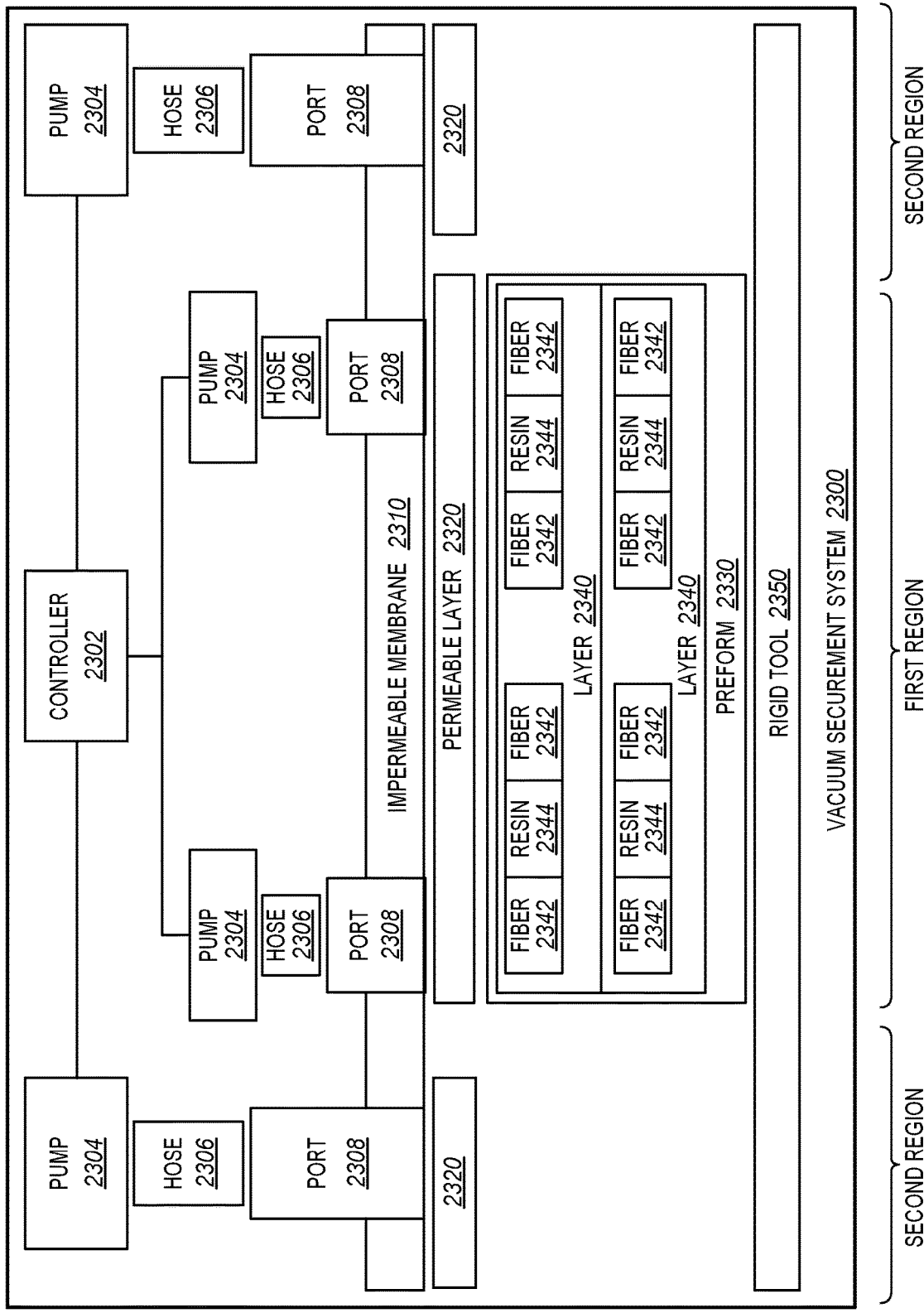
FIG. 23 is a block diagram of a vacuum securement system in an illustrative embodiment.

FIG. 23 is a block diagram of a vacuum securement system 2300 in an exemplary embodiment. According to FIG. 23, vacuum securement system 2300 includes rigid tool 2350, upon which a preform 2330 is placed. Preform 2330 includes multiple layers 2340 of material, such as dry carbon fiber, prepreg tows, pick and place materials, CFRP, etc. Each layer includes multiple parallel fibers 2342 as well as resin 2344 (e.g., a thermoset or thermoplastic resin). An impermeable membrane covers the preform 2330, and a permeable layer 2320 is interposed between the preform 2330 and impermeable membrane 2310. Ports 2308 and hoses 2306 provide a passageway for pumps 2304 to draw air trapped between the impermeable membrane 2310 and the preform 2330, which results in a suction hold on the preform 2330 in the first region. Meanwhile, ports 2308 in the second region apply negative pressure which secures the impermeable membrane 2310 to the rigid tool 2350. Controller 2302 manages the operations of pumps 2304. For example, controller 2302 may adjust the amount of power applied to pumps 2304 in order to ensure a constant level of pressure or airflow, or to selectively control application of negative pressure to the first region and/or second region. When negative pressure is applied, air being drawn out by pumps 2304 is sufficient to offset air incursion along the perimeter of the impermeable membrane 2310 due to loss of vacuum. This maintains a desired level of vacuum under the vacuum bag.

Figure 24:
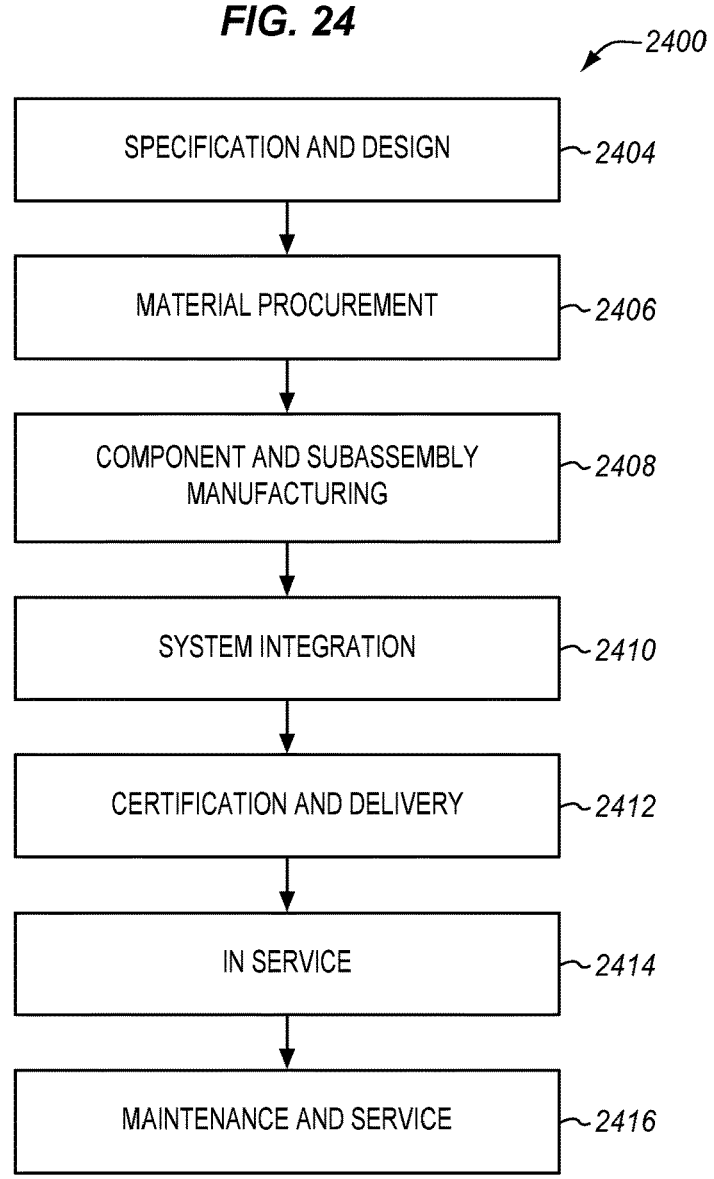
FIG. 24 is a flow diagram of aircraft production and service methodology in an exemplary embodiment.
Figure 25:
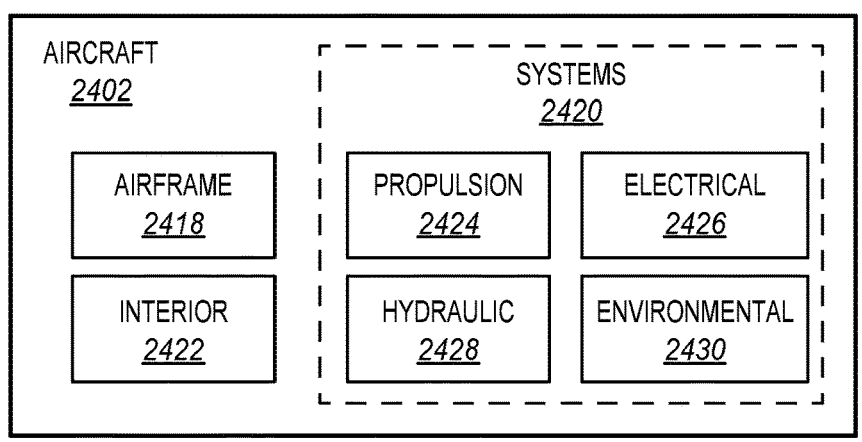
FIG. 25 is a block diagram of an aircraft in an exemplary embodiment.

Referring more particularly to the drawings, embodiments of the disclosure may be described in the context of an aircraft manufacturing and service method 2400 as shown in FIG. 24 and an aircraft 2402 as shown in FIG. 25. During pre-production, exemplary method 2400 may include specification and design 2404 of the aircraft 2402 and material procurement 2406. During production, component and subassembly manufacturing 2408 and system integration 2410 of the aircraft 2402 takes place. Thereafter, the aircraft 2402 may go through certification and delivery 2412 in order to be placed in service 2414. While in service by a customer, the aircraft 2402 is scheduled for routine maintenance and service 2416 (which may also include modification, reconfiguration, refurbishment, and so on). Apparatus and methods embodied herein may be employed during any one or more suitable stages of the production and service method 2400 (e.g., specification and design 2404, material procurement 2406, component and subassembly manufacturing 2408, system integration 2410, certification and delivery 2412, service 2414, maintenance and service 2416) and/or any suitable component of aircraft 2402 (e.g., airframe 2418, systems 2420, interior 2422, propulsion 2424, electrical 2426, hydraulic 2428, environmental 2430).

Each of the processes of method 2400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 25, the aircraft 2402 produced by exemplary method 2400 may include an airframe 2418 with a plurality of systems 2420 and an interior 2422. Examples of high-level systems 2420 include one or more of a propulsion system 2424, an electrical system 2426, a hydraulic system 2428, and an environmental system 2430. Any number of other systems may be included. Although an aerospace example is shown, the principles of the invention may be applied to other industries, such as the automotive industry.

As already mentioned above, apparatus and methods embodied herein may be employed during any one or more of the stages of the production and service method 2400. For example, components or subassemblies corresponding to production stage 2408 may be fabricated or manufactured in a manner similar to components or subassemblies produced while the aircraft 2402 is in service. Also, one or more apparatus embodiments, method embodiments, or a combination thereof may be utilized during the production stages 2408 and 2410, for example, by substantially expediting assembly of or reducing the cost of an aircraft 2402. Similarly, one or more of apparatus embodiments, method embodiments, or a combination thereof may be utilized while the aircraft 2402 is in service, for example and without limitation, to maintenance and service 2416. For example, the techniques and systems described herein may be used for steps 2406, 2408, 2410, 2414, and/or 2416, and/or may be used for airframe 2418 and/or interior 2422. These techniques and systems may even be utilized for systems 2420, including for example propulsion 2424, electrical 2426, hydraulic 2428, and/or environmental 2430.

In one embodiment, a laminate is cured into a composite part that comprises a portion of airframe 2418, and is manufactured during component and subassembly manufacturing 2408. The composite part may then be assembled into an aircraft in system integration 2410, and then be utilized in service 2414 until wear renders the composite part unusable. Then, in maintenance and service 2416, the part may be discarded and replaced with a newly manufactured composite part. Inventive components and methods may be utilized throughout component and subassembly manufacturing 2408 in order to secure laminates that will be cured into new composite parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for picking up, placing, and compacting an object, the method comprising: covering a part of an object with an impermeable membrane; applying a first negative pressure via an end effector that is sufficient to offset any air leaks between a first portion of the impermeable membrane and the object, thereby forming a suction hold that secures the object to the impermeable membrane; transporting the object to a rigid tool while the suction hold is retained; and applying a second negative pressure via the end effector that offsets air leaks between a second portion of the impermeable membrane and the rigid tool, thereby forming a suction hold that compacts the object to the rigid tool.

2. The method of claim 1 wherein:
the second portion of the impermeable membrane surrounds the first portion of the impermeable membrane.

3. The method of claim 1 wherein:
the second portion of the impermeable membrane draws air from a preliminary compaction bag that covers the object and extends beyond a perimeter of the object.

4. The method of claim 3 further comprising:
placing a permeable layer onto the object that conforms with the object and contacts a permeable layer at the preliminary compaction bag.

5. The method of claim 1 further comprising:
placing a permeable layer onto the object that conforms with the object and is located between the object and the impermeable membrane.

6. The method of claim 5 wherein:
the permeable layer comprises a compliant biplanar mesh of material that facilitates airflow.

7. The method of claim 5 wherein:
the permeable layer comprises an open celled foam material.

8. The method of claim 1 wherein:
the rigid tool comprises a mandrel for a full barrel section of fuselage for an aircraft; and
the object comprises a preform for a stringer.

9. The method of claim 1 further comprising:
exposing an opening between a chamber that applies the first negative pressure to the first portion, and a chamber that applies the second negative pressure to the second portion, thereby causing suction to be applied to both the first portion and the second portion.

10. The method of claim 1 further comprising:
removing the impermeable membrane and the end effector from the object after the object is compacted to the rigid tool.

11. The method of claim 1 further comprising:
operating multiple end effectors synchronously to transport the object.

12. The method of claim 1 further comprising:
applying an intermediate compaction bag to the object.

13. The method of claim 1 wherein: transporting the object comprises operating one or more actuators to drive the end effector into position over the rigid tool while the first negative pressure continues to be applied.

14. The method of claim 1 further comprising: adjusting an intensity of pumping operations in order to maintain the first and second negative pressure at a constant amount.

15. The method of claim 1 wherein:
an amount of holding force used while transporting the object is based upon a difference between a volume per unit time drawn by a pump, and a total area covered by the impermeable membrane.

16. The method of claim 1 wherein:
the impermeable membrane is not affixed the object via sealant, glue, fasteners, or magnetism.

17. The method of claim 1 wherein:
at least one of the first and second negative pressure is maintained by evacuating an equal or greater amount of air than is lost via the air leaks.

18. The method of claim 1 wherein:
the impermeable membrane surrounds a border of the end effector.

19. The method of claim 1 wherein: the first negative pressure is applied via passages in a manifold.

20. The method of claim 1 further comprising:
operating outriggers to compact the object after the object has been placed by the end effector.

* * * * *